United States Patent [19]

Olds et al.

[11] Patent Number: 5,714,421
[45] Date of Patent: Feb. 3, 1998

[54] INORGANIC FIBER COMPOSITION

[75] Inventors: Leonard Elmo Olds, Castle Rock; William Henry Kielmeyer, Englewood, both of Colo.

[73] Assignee: Manville Corporation, Denver, Colo.

[21] Appl. No.: 279,527

[22] Filed: Jul. 25, 1994

Related U.S. Application Data

[63] Continuation of Ser. No. 52,825, Apr. 23, 1993, Pat. No. 5,332,699, which is a continuation of Ser. No. 356,595, May 24, 1989, abandoned, which is a continuation of Ser. No. 201,513, Jun. 1, 1988, which is a continuation-in-part of Ser. No. 16,041, Feb. 18, 1987, abandoned, which is a continuation-in-part of Ser. No. 894,175, Aug. 7, 1986, abandoned, which is a continuation-in-part of Ser. No. 831,217, Feb. 20, 1986, abandoned.

[51] Int. Cl.⁶ .................................................. C03C 13/06
[52] U.S. Cl. .................................................. 501/36; 501/38
[58] Field of Search .......................... 501/36, 31, 37, 501/38, 68, 95

[56] References Cited

U.S. PATENT DOCUMENTS

| | | |
|---|---|---|
| 2,051,279 | 8/1936 | Thorndyke . |
| 2,155,107 | 4/1939 | Tyler et al. ............................ 501/36 |
| 2,576,312 | 11/1951 | Minnick ................................ 501/36 |
| 3,799,836 | 3/1974 | Tomic et al. . |
| 4,036,654 | 7/1977 | Yale et al. ............................ 501/38 |
| 4,054,472 | 10/1977 | Kondo et al. ........................ 501/38 |
| 4,153,439 | 5/1979 | Tomic et al. ........................ 501/36 |
| 4,238,213 | 12/1980 | Pallo et al. ............................ 65/8 |
| 4,325,724 | 4/1982 | Froberg ................................ 501/35 |
| 4,342,581 | 8/1982 | Neubauer et al. .................. 65/4.4 |
| 4,351,054 | 9/1982 | Olds .................................... 373/38 |
| 4,366,251 | 12/1982 | Rapp .................................... 501/36 |
| 4,615,988 | 10/1986 | Le Moigne et al. ................ 501/36 |
| 4,693,740 | 9/1987 | Noiret et al. ..................... 65/DIG. 4 |
| 5,248,637 | 9/1993 | Taneda et al. . |
| 5,332,699 | 7/1994 | Olds et al. ........................... 501/36 |

FOREIGN PATENT DOCUMENTS

| | | | |
|---|---|---|---|
| 255803 | 7/1963 | Australia ........................ 501/38 | |
| 588493 | 12/1959 | Canada ........................... 501/36 | |
| 0 076 677 | 4/1983 | European Pat. Off. . | |
| 76677 | 4/1983 | European Pat. Off. . | |
| 0 144 349 | 6/1985 | European Pat. Off. . | |
| 1165275 | 1/1957 | France . | |
| 1 165 275 | 10/1958 | France . | |
| 1 942 991 | 4/1972 | Germany . | |
| 1942991 | 4/1972 | Germany . | |
| 51-13819 | 2/1976 | Japan . | |
| 51-043429A | 4/1976 | Japan . | |
| 51-133311 | 11/1976 | Japan . | |
| 52-4519 | 1/1977 | Japan . | |
| 56-54252 | 5/1981 | Japan . | |
| 607807 | 5/1978 | U.S.S.R. ........................ 501/36 | |
| 2150553 | of 0000 | United Kingdom .......... 501/36 | |
| 520 247 | 4/1940 | United Kingdom . | |
| 520247 | 4/1940 | United Kingdom .......... 501/25 | |
| 810773 | 1/1957 | United Kingdom . | |
| 810 773 | 3/1959 | United Kingdom . | |
| 1 209 244 | 10/1970 | United Kingdom . | |
| 1209244 | 10/1970 | United Kingdom . | |
| 1273205 | 5/1972 | United Kingdom . | |
| 1399556 | 7/1975 | United Kingdom . | |
| 1 446 910 | 8/1976 | United Kingdom . | |
| 1446910 | 8/1976 | United Kingdom . | |
| 2083017 | 8/1981 | United Kingdom . | |
| 2 083 017 | 3/1982 | United Kingdom . | |
| 2122537 | 1/1984 | United Kingdom ........... 501/36 | |
| 2 150 553 | 7/1985 | United Kingdom . | |
| WO/85/02394 | 6/1985 | WIPO . | |
| WO 93/15208 | 8/1993 | WIPO . | |

OTHER PUBLICATIONS

Carlock, D.E., Ceramic Fibres, *Refractories Journal*, 58(1983)17–20 (no month available).

Dietrichs & Kronert, *Gas Wärme International*, 30(1981) (no month available).

Ofentechnik Stahl & Eisen, 110 (1990)6, 115 (no month available).

Keramishe Zeitschriften, 33(1981)9, 516 (no month available).

Extract from DIN V ENV 1094, Part 7, section 7, 9–12 no date available.

Japanese Patent Publication Sho 51-1333311 (Nov. 19, 1976) Kardo et al. (see attached translation for entire document previously provided).

"The Behavior of Mineral Fibres in Physiological Solutions," H. Förster, *Proceedings of 1982 WHO LARC Conference*, Copenhagen, vol. 2, pp. 27–55 (1988).

Standard Test Methods for Fire Tests of Building Construction and Materials (ASTM) E119-88 (fourteen pages; 1988).

"Advertisement for the Sale of a Fiber Glass Blanket Under the Name New Super Wool™," published after Sep. 1986 (on or about Jan. 1987.

"An in vitro Study of the Chemical Durability of Siliceous Fibres," H. Scholze & R., Conradt, *Annals of Occupational Hygiene*, 31(4B):683–692 (1987).

"Chemical Durability of Asbestos and of Man–made Mineral Fibres in vivo," B. Bellman et al., *Aerosol Scientist*, vol. 17, No. 3, pp. 341–345 (1986).

"Development of a Deoiling Process for Recycling Millscale," *Recycling in the Steel Industry, Proceedings of the 1st Process Technology Conference*, vol. 1, pp. 184–187, Washington, D.C (Mar. 25–26, 1980).

(List continued on next page.)

*Primary Examiner*—Paul Marcantoni
*Attorney, Agent, or Firm*—Dean W. Russell; Bruce D. Gray; Kilpatrick Stockton LLP

[57] ABSTRACT

Inorganic fibers which have a silicon extraction of greater than about 0.02 wt % Si/day in physiological saline solutions. The fiber contains $SiO_2$, MgO, CaO, and at least one of $Al_2O_3$, $ZrO_2$, $TiO_2$, $B_2O_3$, iron oxides, or mixtures thereof. Also disclosed are inorganic fibers which have diameters of less than 3.5 microns and which pass the ASTM E-119 two hour fire test when processed into a fiber blanket having a bulk density in the range of about 1.5 to 3 pcf.

12 Claims, No Drawings

OTHER PUBLICATIONS

"Glass Compositions for Glass Fibers," Moriya, Ichiro, et al., *Chemical Abstracts*, vol. 89, No. 22, pp. 28, Abstract 184615W (1978).

"Glass for Making Glass Fiber," Grigor'ev, V.S., et al., *Chemical Abstracts*, vol. 81, No. 22, Abstract 140076b (1974).

"Effects of Glass Surface Area to Solution Volume Ration on Glass Corrosion", E.C. Ethridge, etc., Physics and Chemistry of Glasses, vol. 20, No. 2, pp. 35–40 (Apr., 1979).

"Dissolution Kinetics of Magnesium Silicates", Robert W. Luce, etc., Geochimica et Cosmochimica Acta, vol. 36, pp. 35–50 (1972).

"Solubility of Asbestos and Man–Made Fibers in Vitro and in Vivo: Its Significance in Lung Disease", A. Morgan and A. Holmes, *Environmental Research* 39, pp. 475–484 (1986).

"Fiber Toxicology", J.P. Leineweber, Ph.D., *Journal of Occupational Medicine*, vol. 23,No.6,pp.431–434 (Jun., 1981).

"Man–made Vitreous Fibers: An Overview of Studies on Their Biologic Effects:," Paul Gross, M.D., American Industrial Hygiene Assn.J.47 (II), pp.717–723 (Nov.1986).

"Pathogenicity of MMMF and the Contrasts with Natural Fibres", D.M. Bernstein, etc., *Proc. 1982 WHO/LARC Conf.*, Copenhagen, vol.2, pp.169–195 (1984).

"The Dissolution of Asbestos Fibres in Water", Janet R. Gronow, Clay Minerals 22, pp. 21–35 (1987).

"Corrosion Phenomena in Glass Fibers and Glass Fiber Reinforced Thermosetting Resins", A.Bledzki, etc., *Composites Science and Technology* 23, pp.263–285 (1985).

Chemical Abstracts, vol. 89, No. 22, Nov. 27, 1978 at p. 28, Abstract 184615W.

Japanese Patent Publication Sho 51–1333311 (Nov. 19, 1976) Kondo et al. (see attached translation for entire document).

Sun, K; "A Scale of Acidity and Basicity in Glass", The Glass Industry, pp. 73–75, Feb. 1948.

Bauer, J et al.; "Solubility and Durability of Man Made Mineral Fibers"; Paper Presented at Technical Association of Pulp and Paper Institute, Apr. 4, 1988, copy–application.

Mohr, J. and Rowe, W., *Fiberglass*, Chapter 2, "Methods of Forming Fibrous Glass for Insulation and Mat Products", pp. 4–23, Van Nostrand Reinhold Company, New York (1978).

Ohta, H. and Suzuki, Y., "Chemical Durability of Glasses in the Systems $SiO_2$–CaO–$Na_2O$–$R_mO_n$," Ceramic Bulletin, 57(6):602 (1978).

Morgan, A., et al., "Solubility of Asbestos and Man–Made Fibers in Vitro and in Vivo: Its Significance in Lung Disease," *Environmental Research*, vol. 39, pp. 475–488 (1986).

Norton, F.H., *Elements of Ceramics*, Addison–Wesley Publishing Co., Inc., Reading, Massachusetts (1952) p. 39.

Bauer, J., et al., "Solubility and Durability of Man Made Mineral Fibers," TAPPI Meeting, Nashville, Tennessee (Apr. 4, 1988).

Bernstein, D.M., et al., "Pathogenicity of MMMF and the Contrasts with Natural Fibres," *Proc. 1982 WHO/IARC Conf. Copenhagen*, vol. 3, pp. 169–195.

Bledzki, A., et al., "Corrosion Phenomena in Glass Fiber Reinforced Thermosetting Resins," *Composites Science & Technology*, vol. 23, pp. 263–285 (1985).

Chien, Y.T., et al., "Preparation and Properties of Barium Ferrite Using Hot–Rolled Mill Scale," J. Am. Ceram. Soc., vol. 72, No. 8, pp. 1328–1332 (1989).

Ethridge, E.C., et al., "Effects of Glass Surface Area to Solution Volume Ration on Glass Corrosion," *Physics and Chemistry of Glasses*, vol. 20, No. 2, pp. 35–40 (Apr. 1979).

Gronow, J.R., "The Dissolution of Asbestos Fibres in Water," *Clay Minerals*, vol. 22, pp. 21–35 (1987).

Gross, P., "Man–Made Vitreous Fibers: An Overview of Studies on their Biologic Effects," *American Industrial Hygiene Assn. J.* 47, (II), pp. 717–723 (Nov. 1986).

INORGANIC FIBER COMPOSITION

This application is a continuation of U.S. patent application Ser. No. 07/052,825, filed Apr. 23, 1993, now U.S. Pat. No. 5,332,699, which is a continuation of U.S. patent application Ser. No. 07/356,595, filed May 24, 1989, now abandoned, which is a continuation of U.S. patent application Ser. No. 07/201,513, filed Jun. 1, 1988, which is a continuation-in-part application of U.S. patent application Ser. No. 07/016,041 filed Feb. 18, 1987, now abandoned which is a continuation-in-part of U.S. patent application Ser. No. 06/894,175, filed Aug. 4, 1986 now abandoned, which is a continuation-in-part of U.S. patent application Ser. No. 06/831,217, filed Feb. 20, 1986, now abandoned.

FIELD OF THE INVENTION

This invention relates to inorganic fiber compositions and more particularly it relates to inorganic fiber compositions which can contain silica, magnesia, calcium oxide, alumina, and other oxides. Some of the inventive fibers have excellent fire ratings, some have especially low durabilities in physiological saline solutions, and some have combinations of these foregoing properties.

BACKGROUND OF THE INVENTION

For many years inorganic fibers, generically referred to in the industry as "mineral wool fibers", made from slag, rock, fly ash, and other by-product raw materials have been manufactured. These fibers have been typically manufactured by melting the slag, rock, etc. containing such oxides as silica, alumina, iron oxide (ferrous and ferric), calcium oxide, and magnesia; allowing the molten material to be blown by gas or steam or to impinge on rotors at high speeds; and causing the resulting blown or spun fibers to be accumulated on a collecting surface. These fibers are then used in bulk or in the form of mats, blankets, and the like as both low and high temperature insulation. U.S. Pat. No. 2,576,312 discloses a conventional mineral wool composition and method for making the same.

In the past, the industry has well recognized the standard drawbacks associated with conventional mineral wool fibers. Conventional mineral wool fibers may have high contents of undesired oxides which often detract from their refractory properties. The conventional mineral wools are coarse, i.e. they have average fiber diameters of 4 to 5 microns (measured microscopically) and have high shot contents in the range of 30 to 50 weight percent. The coarseness of the fiber reduces the insulating value of the fiber and makes conventional mineral wool unpleasant to handle and unfriendly to the touch. For example, because of their coarse fiber diameters, conventional mineral wool blankets must have bulk densities of from 4 to 8 pcf and even higher in order to pass the ASTM E-119 two hour fire test. On the other hand, fiber glass blankets are often made with bulk densities of 2 pcf or lower. While the fiber glass blankets are friendly because of their low bulk densities and relatively fine fiber diameter, they do not have sufficient fire resistance so as to pass even the one hour ASTM E-119 fire test.

Recently, another potential problem with traditional mineral wool and other types of fiber has been recognized. It is well known that inhalation of certain types of fiber can lead to elevated incidence of respiratory disease, including cancers of the lung and surrounding body tissue. Several occurrences are well-documented in humans for several types of asbestos fiber. Although for other varieties of natural and manmade mineral fiber direct and unequivocal evidence for respiratory disease is lacking, the potential for such occurrence has been inferred from results of tests on laboratory animals. In the absence or insufficiency of direct human epidemiological data, results from fiber inhalation or implantation studies on animals provides the best "baseline information" from which to extrapolate disease potential.

Chronic toxicological studies on animals have, however, been able to statistically demonstrate the importance of three key factors that relate directly to the potential for respiratory disease and especially carcinoma: (a) dose of fiber received (including time of exposure); (b) dimension of the inhaled fiber; and (c) persistence of the fiber within the lung. The effects of dose and dimension have been well-characterized from such studies and as a result are fairly well known in regard to human disease potential. The dose is obviously a product of the environment in which the fiber is used and the manner in which it is used. The dimension and persistence of the fiber within the lung, on the other hand, are functions of the manner in which the fiber is formed and of its chemical composition. In general, the smaller the fiber the more likely that it will become embedded in lung tissue when inhaled, thus increasing the danger of respiratory disease.

Although less is known about the link between persistence of the fiber within the lung and respiratory disease, increasing attention is being focused on this aspect of the health issue. Biological persistence refers to the length of time a fiber endures as an entity within the body. The physiochemical concept that most closely relates to persistence and is perhaps more easily quantified is that of "durability"—specifically, the chemical solubility resistance to solubility) of fibers in body fluids and the tendency of such fibers to maintain physical integrity within such an environment. In general, the less durable a fiber is, the less will be the potential health risk associated with the inhalation of that fiber. One method of measuring the chemical durability of a fiber in body fluids is to measure its durability in physiological saline solutions. This can be done by quantifying the rate of extraction of a chemical component of the fiber such as silicon into the physiological saline solution over a certain period of time.

Thus, as can be easily concluded from the foregoing discussion, conventional mineral wool fibers have several serious drawbacks. However, even the alternatives to mineral wools have problems. For example, as mentioned earlier glass fibers have a fire resistance problem and whereas the refractory ceramic fibers have been gaining increasing use in recent years as an alternative to mineral wool fibers because of their ultra-high temperature resistance and superior ability to pass all fire rating tests, their use is limited by the fact that they are relatively expensive and have a relatively high chemical durability in physiological saline solutions as well.

In conclusion, there is a great need in the industry for low cost, friendly feeling low bulk density inorganic fibers which have good fire resistance properties as measured by their ability to pass the ASTM E-119 two hour fire test. Additionally, there is a tremendous demand for fibers which have especially low durabilities in physiological saline solutions. What would be particularly advantageous to the industry would be fibers with combinations of the above mentioned sought after properties. Also advantageous would be fibers which also have excellent refractory properties as well, e.g. high continuous service temperatures.

SUMMARY OF THE INVENTION

In one embodiment of the present invention there are provided inorganic fibers having a silicon extraction of greater than about 0.02 wt % Si/day in physiological saline solutions and a composition consisting essentially of about 0–10 wt % of either $Al_2O_3$, $ZrO_2$, $TiO_2$, $B_2O_3$, iron oxides, or mixtures thereof; 35–70 wt % $SiO_2$; 0–50 wt % MgO; and CaO.

In another embodiment of the present invention, there are provided inorganic fibers which have a 5 hour silicon extraction physiological saline solutions of at least about 10 ppm. These fibers can broadly have compositions consisting essentially of the following ingredients at the indicated weight percentage levels:

0–1.5 wt % of either $Al_2O_3$, $ZrO_2$, $TiO_2$, $B_2O_3$, iron oxides, or mixtures thereof; 40–70 wt % $SiO_2$; 0–50 wt % MgO; and CaO 1.5–3 wt % of either $Al_2O_3$, $ZrO_2$, $TiO_2$, $B_2O_3$, iron oxides, or mixtures thereof; 40–66 wt % $SiO_2$; 0–50 wt % MgO; and CaO 3–4 wt % of either $Al_2O_3$, $ZrO_2$, $TiO_2$, $B_2O_3$, iron oxides, or mixtures thereof; 40–63 wt % $SiO_2$; 0–50 wt % MgO; and CaO 4–6 wt % of either $Al_2O_3$, $ZrO_2$, $TiO_2$, $B_2O_3$, iron oxides, or mixtures thereof; 40–59 wt % $SiO_2$; 0–25 wt % MgO; and CaO 6–8 wt % of either $Al_2O_3$, $ZrO_2$, $TiO_2$, $B_2O_3$, iron oxides, or mixtures thereof; 35–54 wt % $SiO_2$; 0–25 wt % MgO; and CaO 8–10 wt % of either $Al_2O_3$, $ZrO_2$, $TiO_2$, $B_2O_3$, iron oxides, or mixtures thereof; 35–45 wt % $SiO_2$; 0–20 wt % MgO; and CaO In a preferred embodiment, inventive fibers with 5 hour silicon extractions of greater than about 20 ppm and most preferably greater than about 50 ppm are provided.

In another embodiment of the present invention there are provided inorganic fibers having a diameter of less than 3.5 microns and which pass the ASTM E-119 two hour fire test when processed into a fiber blanket having a bulk density in the range of about 1.5 to 3 pcf and having a composition consisting essentially of about: 0–10 wt % of either $Al_2O_3$, $ZrO_2$, $TiO_2$, $B_2O_3$, iron oxides, or mixtures thereof; 58–70 wt % $SiO_2$; 0–21 wt % MgO; 0–2 wt % alkali metal oxides; and CaO and wherein the amount of alumina+zirconia is less than 6 wt % and the amount of iron oxides or alumina+iron oxides is less than 2 wt %. Preferably, the inventive fibers in this embodiment may have compositions consisting essentially of about:

0–1.5 wt % of either $Al_2O_3$, $ZrO_2$, $TiO_2$, $B_2O_3$, iron oxides, or mixtures thereof; 58.5–70 wt % $SiO_2$; 0–21 wt % MgO; 0–2 wt % alkali metal oxides; and CaO greater than 1.5 wt % up to and including 3 wt % of either $Al_2O_3$, $ZrO_2$, $TiO_2$, $B_2O_3$, iron oxides, or mixtures thereof; 58.5–66 wt % $SiO_2$; 0–21 wt % MgO; 0–2 wt % alkali metal oxides; and CaO greater than 3 wt % up to and including 4 wt % of either $Al_2O_3$, $ZrO_2$, $TiO_2$, $B_2O_3$, iron oxides or mixtures thereof; 58–63 wt % $SiO_2$; 0–8 wt % MgO; 0–2 wt % alkali metal oxides; and CaO greater than 4 wt % up to and including 6 wt % of either $Al_2O_3$, $ZrO_2$, $TiO_2$, $B_2O_3$, iron oxides, or mixtures thereof; 58–59 wt % $SiO_2$; 0–7 wt % MgO; 0–2 wt % alkali metal oxides; and CaO.

As discussed herein earlier, there has been a demand in the industry for inorganic fibers with an excellent fire rating at low bulk densities and fibers with especially low chemical durabilities in physiological saline solutions. Therefore, each category of inventive fibers should fulfill a real need in the industry and should be available for applications where heretofore low cost, mineral wool type fibers have not been available. What is particularly advantageous about the present invention is the fact that fibers are provided where a special demand exists, i.e. applications in the industry where fibers with both an excellent fire rating and an especially low durability in physiological saline solutions are in demand.

Other features and aspects, as well as the various benefits and advantages, of the present invention will be made clear in the more detailed description which follows.

DETAILED DESCRIPTION OF THE INVENTION

The inventive fiber compositions of the present invention can be made from either pure metal oxides or less pure raw materials which contain the desired metal oxides. Table I herein gives an analysis of some of the various raw materials which can be used to make inventive fiber compositions. Physical variables of the raw materials such as particle size may be chosen on the basis of cost, handleability, and similar considerations.

Except for melting, the inventive fibers are formed in conventional inorganic fiber forming equipment and by using standard inorganic fiber forming techniques as known to those skilled in the art. Preferably, production will entail electric furnace melting rather than cupola melting since electric melting keeps molten oxides of either pure or less pure raw materials more fully oxidized thereby producing longer fibers and stronger products. The various pure oxides or less pure raw materials are granulated to a size commonly used for electric melting or they may be purchased already so granulated.

The granulated raw materials are then mixed together and fed to an electric furnace where they are melted by electric resistance melting with electrodes preferably positioned according to the teachings of U.S. Pat. No. 4,351,054. Melt formation can be either continuous or batchwise although the former is preferred. The molten mixture of oxides is then fiberized as disclosed in U.S. Pat. No. 4,238,213.

While the fiberization techniques taught in U.S. Pat. No. 4,238,213 are preferred for making the inventive fibers, other conventional methods may be employed such as sol-gel processes and extrusion through holes in precious metal alloy baskets.

The fibers so formed will have lengths in the range of from about 0.5 to 20 cm and diameters in the range of from about 0.05 to 10 microns with the average fiber diameter being in the range of about 1.5 to 3.5 microns. Table 2 shows the average fiber diameter (measured microscopically) and the unfiberized shot content of various inventive fibers. As may be seen, the average microscopic fiber diameter was 2.3 microns and the average unfiberized shot content was 27%.

For purposes of comparison, conventional mineral wool fibers were also tested with the results being given in Table 2 as numbers 226 to 229. These conventional fibers averaged 4.7 microns (measured microscopically) in diameter and had an average 40 wt % shot content. The continuous service temperature ranged from 1370° F. to 1490° F., averaging 1420° F.

Table 3 contains an extensive chemical analysis of a number of inventive fibers. Because of the large number of fiber samples containing alumina additives made to the base calcium oxide/magnesia/silica system, only the average analysis of the minor constituent of these fibers are given in Table 3. The silica, alumina, magnesia, and calcium oxide contents for these fibers are given in Table 4.

As used herein, the "service temperature" of an inorganic fiber is determined by two parameters. The first is the obvious condition that the fiber must not soften or sinter at the temperature specified. It is this criterion which precludes the use of glass fibers at temperatures above about 800° F. to 1000° F. (425° to 540° C.). Additionally, a felt or blanket made from the fibers must not have excessive shrinkage when soaking at its service temperature. "Excess shrinkage" is usually defined to be a maximum of 5% linear or bulk shrinkage after prolonged exposure (usually for 24 hours) at the service temperature. Shrinkage of mats or blankets used as furnace liners and the like is of course a critical feature, for when the mats or blankets shrink they open fissures between them through which the heat can flow, thus defeating the purpose of the insulation. Thus, a fiber rated as a "1500° F. (815° C.) fiber" would be defined as one which does not soften or sinter and which has acceptable shrinkage at that temperature, but which begins to suffer in one or more of the standard parameters at temperatures above 1500° F. (815° C.).

The service temperatures for a representative number of fibers in the inventive compositional range are listed in Table 2. The continuous service temperature for constant silica/magnesia/calcium oxide ratios are given in Table 6. As may be seen in all cases, the lower the alumina content of the fiber, the higher the service temperature will be, with the highest service temperature being at zero percent alumina for alumina contents less than 30%. Thus to attain the most desired properties of the inventive fiber it is not possible to accept any of the alumina contents resulting from melting the traditional mineral wool raw materials. Rather, various amounts of sufficiently pure oxides will be required to dilute the alumina contents to the desired low levels. To attain fibers of the highest service temperatures, only pure raw materials with essentially no significant amounts of alumina must be used.

A series of inventive fibers were also tested for their silicon extraction in a saline solution according to the following procedure:

A buffered model physiological saline solution was prepared by adding to 6 liters of distilled water the following ingredients at the indicated concentrations:

| Ingredient | Concentration, g/l |
| --- | --- |
| $MgCl_2 6H_2O$ | 0.160 |
| NaCl | 6.171 |
| KCl | 0.311 |
| $Na_2HPO_4$ | 0.149 |
| $Na_2SO_4$ | 0.079 |
| $CaCl_2 2H_2O$ | 0.060 |
| $NaHCO_3$ | 1.942 |
| $NaC_2H_3O_2$ | 1.066 |

Before testing, this solution was buffered to a pH of 7.6 by bubbling with a gaseous mixture of 5% $CO_2$/95%$N_2$.

One half (½) gram of each sample of fiber listed in Table III was then placed into separate closed, plastic bottles along with 50 cc of the prepared physiological saline solution and put into an ultrasonic bath for 5 hours. The ultrasonic vibration application was adjusted to give a temperature of 104° F. at the end of the 5 hour period. At the end of the test period, the saline solution was filtered and the solution chemically analyzed for silicon content. The silicon concentration in the saline solution was taken to be a measure of the amount of fiber which solubilized during the 5 hour test period. The CaO and MgO contents of the fiber were similarly solubilized.

One of the inventive fibers was tested for silicon extraction in a physiological saline solution for periods of up to 6 months. Results were as follows:

| Fiber Number | Silicon Extraction in 6 months | Steady State Silicon Extraction Rate For 0.20 $m^2$/g Surface Area, % Si/day | Total Amphoteric Oxides in Fiber | Comments on Fiber Residue After 6 Months |
| --- | --- | --- | --- | --- |
| 29 (inventive) | 96% | 0.16% | 1.0% | carbonate hydroxyl apatite fiber, disintegrated into small particles |
| 137 (non-inventive) | 3% | 0.013% | 8.9% | slight fine grained fibers with uniform corrosion |
| 235 (non-inventive) | 4% | 0.012% | 25.6% | no fiber corrosion some surface deposition |

Categorization of oxides melts according to scales of acidity or basicity has been well known for many years. (See "A Scale of Acidity and Bascity in Glass", Glass Industry, February 1948, pp 73–74) We have now found that by strictly controlling the compositions of the oxide melts according to the acidic or basicity behavior of the respective oxides, fibers can be made which are surprisingly soluble in saline solutions. Increasing the content of silica, alumina, and the amphoteric oxides in the fiber increases the acid ratio of the fiber composition. This tends to stabilize the system against silicon extraction by weak solutions as a result of relative changes in the interatomic bonding forces and extension of the silica network. Other amphoteric oxides besides alumina will have an alumina equivalency with respect to extraction by saline solutions. The amphoteric oxides zirconia and titania appear to have an alumina equivalency of close to 1 to 1. We have found that in general for desired high saline solubility the amount of total amphoteric oxides must be kept below about 10% depending upon the amount of silica present. On the other hand, with the exception of iron and manganese oxides, the basic oxides can vary widely since their alumina equivalency is small. However, while iron and manganese oxides are generally considered to be basic in nature, their behavior with respect to saline solubility more closely relate to the amphoteric oxides, thus the amounts of iron and manganese oxides must be similarly limited.

Many of the fibers were tested for their fire resistance according to the following simulated fire rating test procedure:

For screening test purposes, a small furnace was constructed using an electrically heated flat-plate element at the back of the heat source. A 6 inch×6 inch×2 inch thick sample of 1¾ to 6½ pcf density of each formulated fiber was mounted parallel with the element and 1 inch from it. Thermocouples were then positioned at the center of the fiber sample surfaces. A computer was used to control power via a simple on-off relay system to the heating element. The position of the relay was based on the reading of the thermocouple on the sample surface nearest the element and the programmed fire test heat-up schedule.

The furnace was heated so as to follow a standard ASTM E-119 time/temperature curve for the 2-hour test period. In the test utilized herein, failure of the fiber is considered to occur when the furnace is unable to maintain the standard temperature per ASTM E-119 because the fiber insulation has sintered sufficiently to allow heat to escape through the fiber layer.

The results of the testing of the fibers for saline solubility and the two hour ASTM E-119 fire test are given in Table 4 for the fibers made with alumina addition and in Table 5 for the remaining fibers to which other oxidic constituents were added. These additions included: $B_2O_3$, $P_2O_5$, $TiO_2$, $ZrO_2$, $Fe_2O_3$+MnO, $La_2O_3$, $Cr_2O_3$, and $Na_2O$. For glass fibers within the scope of the invention to function in an ASTM E-119 fire test, i.e. to withstand the rising temperatures of a simulated fire which can reach 1850° F. in two hours, it is necessary that they convert from an amorphous condition to a beneficial psuedo crystalline state during heat-up. The inventive fibers do this but can be assisted in this function by the inclusion of suitable crystal nucleating agents. Such agents may include $TiO_2$, $ZrO_2$, platinum, $Cr_2O_3$, $P_2O_5$, and others. Such additions are within the scope of this invention.

TABLE 1

RAW MATERIALS USED

|  | Pure Raw Materials | | | | | Less Pure Raw Materials | | | |
|---|---|---|---|---|---|---|---|---|---|
|  | Silica Sand | Quick Lime | Calcined Dolomite | Aluminum Oxide | Magnesium Oxide | Kaolin | Blast Furnace Slag | Nepheline Syenite | Talc |
| ACIDIC OXIDES | | | | | | | | | |
| $SiO_2$ | 99.0 | 0.34 | 0.50 | 0.02 | 0.4 | 50.5 | 35.16 | 61.3 | 61.2 |
| AMPHOTERIC OXIDES | | | | | | | | | |
| $TiO_2$ | nil | nil | nil | 0.002 | nil | 1.61 | 0.62 | 0.003 | nil |
| $Al_2O_3$ | 0.30 | 0.26 | 0.50 | 98.8 | 0.1 | 43.6 | 12.88 | 23.4 | 0.7 |
| BASIC OXIDES | | | | | | | | | |
| $Fe_2O_3$ | 0.30 | 0.05 | 0.15 | 0.02 | 0.7 | 0.80 | 0.20 | 0.07 | 0.8 |
| MnO | — | — | — | — | — | — | 0.62 | — | — |
| MgO | 0.02 | 0.14 | 40.0 | nil | 96.3 | 0.01 | 16.06 | 0.05 | 31.7 |
| CaO | 0.03 | 97.75 | 57.0 | 0.01 | 2.0 | 0.04 | 32.94 | 0.58 | 0.1 |
| $Na_2O$ | 0.04 | 0.02 | 0.01 | 0.30 | 0.02 | 0.06 | 0.45 | 9.60 | — |
| $K_2O$ | 0.01 | 0.01 | nil | 0.01 | 0.01 | 0.02 | 0.25 | 4.50 | — |
| MISCELLANEOUS | | | | | | | | | |
| $SO_3$ | — | — | 0.4 | — | — | — | 0.28 | — | — |
| $S^-$ | — | — | — | — | — | — | 1.03 | — | — |
| C | — | — | — | — | — | — | 0.30 | — | — |
| LOI | 0.2 | 0.7 | 3.0 | 0.20 | 1.8 | 2.90 | — | 0.62 | 5.0 |
| TOTAL | 99.90 | 99.27 | 101.56 | 99.36 | 101.33 | 99.54 | 100.79 | 100.12 | 99.5 |

Silica Sand: Ottawa Silica - Sil-co-Sil Grade 295
Quick Lime: Mississippi Lime - Pulverized Quick Lime
Calcined Dolomite: Ohio Lime NO. 16 Burnt Dolomitic Lime
Aluminum Oxide: Reynolds Calcined Alumina, RC-23
Magnesium Oxide: Baymag 56 Feed Grade
Kaolin: American Cyanamide Andersonville Kaolin
Blast Furnace Slag: Calumite Morrisville Slag
Nepheline Syenite: Indusmin Grad A400
Talc: Pfizer Grade MP4426
Additives:
Soda Ash: 58.3% $Na_2O$
Boric Acid: 55.5% $B_2O_3$
Magnetite Iron Concentrates: 98.5% Iron Oxides
Zircon: 66.2% $ZrO_2$
Manganese Oxide: 99% $MnO_2$
Titanium Dioxide: 99% $TiO_2$
Chromium Oxide: 99.5% $Cr_2O_3$
Lanthanum Carbonate: Moly Corp.

TABLE 2

FIBER DIAMETER, SHOT CONTENT, AND SERVICE TEMPERATURE OF TEST FIBERS

| Test No. | Average Fiber Diameter Microns | Shot Content % | Service Temperature °F. |
|---|---|---|---|
| 0–1½% Amphoteric Oxides | | | |
| 4 | — | — | 1410 |
| 10 | — | 28 | — |
| 12 | — | — | 1380 |
| 16 | — | 26 | 1400 |
| 17 | 1.9 | — | 1420 |
| 19 | — | — | 1430 |
| 20 | 2.3 | 22 | 1440 |
| 22 | 2.9 | — | 1350 |
| 23 | — | 34 | 1390 |
| 24 | 2.8 | 33 | 1400 |
| 25 | 2.9 | — | 1440 |
| 29 | 1.6 | — | 1450 |
| 30 | 1.5 | — | 1450 |
| 32 | 1.5 | 23 | 1450 |
| 34 | — | — | 1400 |
| 35 | 1.7 | — | 1450 |
| 37 | 2.4 | 22 | 1450 |
| 39 | 1.9 | — | 1450 |
| 40 | — | 33 | 1460 |
| 43 | 1.9 | 32 | 1460 |
| 50 | 2.3 | — | 1500 |
| 58 | — | — | 1490 |
| 65 | 2.0 | 25 | 1420 |
| 81 | — | — | 1500 |
| 82 | — | — | 1370 |
| 83 | — | — | 1390 |
| 1½ To 3% Amphoteric Oxides | | | |
| 87 | 1.9 | 24 | 1410 |
| 90 | 2.0 | — | 1430 |
| 95 | 2.1 | — | 1440 |
| 97 | — | 24 | — |
| 107 | — | — | 1420 |
| 3 To 4% Amphoteric Oxides | | | |
| 110 | — | — | 1320 |
| 111 | — | 23 | 1440 |
| 114 | — | — | 1380 |
| 117 | — | — | 1450 |
| 120 | — | — | 1440 |
| 4 To 6% Amphoteric Oxides | | | |
| 122 | 3.3 | — | 1410 |
| 6 To 8% Amphoteric Oxides | | | |
| 126 | 1.8 | 26 | 1470 |
| 127 | 2.2 | — | 1370 |
| 128 | 3.3 | — | 1380 |
| 129 | 3.4 | — | 1430 |
| 131 | — | 25 | — |
| 133 | — | — | 1420 |
| 8 To 10% Amphoteric Oxides | | | |
| 134 | — | — | 1380 |
| 135 | 2.9 | — | 1410 |
| 137 | 3.1 | — | 1370 |
| 138 | 1.8 | — | 1450 |
| 139 | 1.8 | — | 1370 |
| 140 | — | — | 1400 |
| 10 To 12% Amphoteric Oxides | | | |
| 141 | 1.9 | — | 1460 |
| 141 | 2.0 | — | 1460 |
| 143 | 2.6 | — | 1360 |
| 144 | 3.0 | — | 1360 |
| 12 To 20% Amphoteric Oxides | | | |
| 146 | 2.0 | — | 1460 |
| 20–30% Amphoteric Oxides | | | |
| 150 | 2.5 | — | 1460 |
| 152 | 3.4 | — | 1520 |
| 153 | 3.8 | 32 | — |
| Oxide Additions other than Alumina | | | |
| 167 | 2.5 | — | — |
| 173 | — | — | 1800 |
| 174 | 3.1 | 25 | 1600 |
| 176 | 2.1 | — | — |
| 178 | 1.41 | — | — |
| 179 | 0.9 | — | — |
| 182 | — | 30 | — |
| 183 | 1.7 | 26 | — |
| 186 | — | 25 | 1500 |
| 189 | — | 26 | — |
| 192 | 1.8 | — | — |
| 200 | 2.0 | 36 | — |
| 211 | — | — | 1400 |
| 216 | — | — | 1480 |
| No. of Measurements: | 42 | 22 | 56 |
| Average Value: | 2.3 | 27 | — |
| Conventional Mineral Wool Fibers | | | |
| 226 | 4.3 | 33 | 1370 |
| 227 | 4.7 | 48 | 1350 |
| 228 | 5.4 | 45 | 1450 |
| 229 | 4.4 | 35 | 1490 |
| Average | 4.7 | 40 | 1420 |
| Refractory Fiber | | | |
| 233 | 3.0 | 38 | 1600 |
| 234 | 2.9 | 37 | 2400 |
| 235 | 3.3 | 44 | 1600 |
| 236 | 2.4 | 37 | 2300 |
| 237 | 2.8 | 29 | 2300 |
| 238 | 3.0 | 28 | 2400 |
| 239 | 3.0 | 27 | 2400 |
| 240 | 3.0 | 20 | 2450 |
| 241 | 3.0 | 20 | 2450 |
| Average: | 2.9 | 31 | — |

TABLE 3
COMPOSITION OF FIBERS

| US # NO. | ACIDIC OXIDES | | | AMPHOTERIC OXIDES | | | | BASIC OXIDES | | | | | | | | | | MISCELLANEOUS | | | TOTAL |
|---|---|---|---|---|---|---|---|---|---|---|---|---|---|---|---|---|---|---|---|---|---|
| | $B_2O_3$ | $SiO_2$ | $P_2O_5$ | SUB TOTAL | $TiO_2$ | $Al_2O_3$ | $ZrO_2$ | SUB TOTAL | $FeO_3$ | MnO | $La_2O_3$ | $Cr_2O_3$ | MgO | $Li_2O$ | CaO | BaO | $Na_2O$ | $K_2O$ | SUB TOTAL | $SO_3$ | Misc. | SUB TOTAL | |
| 1 to | 0.00 | — | 0.00 | — | 0.01 | — | 0.01 | 0.02 | 0.06 | 0.02 | 0.00 | 0.02 | — | 0.00 | — | 0.04 | 0.04 | 0.01 | .19 | .05/.20 | .02 | .07/.22 | .14/.44 |
| *Composition of Fibers with $Al_2O_3$ additions (minor constituents only)* | | | | | | | | | | | | | | | | | | | | | | | |
| 164 | — | 64.8 | — | 65.12 | — | 0.06 | — | 0.06 | — | — | — | — | 8.7 | — | 26.6 | — | — | — | 35.3 | — | — | — | 100.48 |
| 165 | 0.32 | 63.9 | — | 64.42 | — | 1.20 | — | 1.20 | — | — | — | — | 8.6 | — | 26.2 | — | — | — | 34.8 | — | — | — | 100.42 |
| 156 | 0.52 | 64.6 | — | 65.24 | — | 0.06 | — | 0.06 | — | — | — | — | 8.7 | — | 26.5 | — | — | — | 35.2 | — | — | — | 100.5 |
| 167 | 0.64 | 64.5 | — | 65.32 | — | 0.06 | — | 0.06 | — | — | — | — | 8.7 | — | 26.5 | — | — | — | 35.2 | — | — | — | 100.58 |
| 168 | 0.82 | 64.1 | — | 65.43 | — | 0.06 | — | 0.06 | — | — | — | — | 8.6 | — | 26.3 | — | — | — | 34.9 | — | — | — | 100.39 |
| 169 | 1.33 | 64.1 | — | 65.47 | — | 0.06 | — | 0.06 | — | — | — | — | 8.6 | — | 26.3 | — | — | — | 34.9 | — | — | — | 100.43 |
| 170 | 1.37 | 63.6 | — | 65.82 | — | 0.06 | — | 0.06 | — | — | — | — | 8.5 | — | 26.1 | — | — | — | 34.6 | — | — | — | 100.48 |
| 171 | 2.22 | 59.6 | — | 68.01 | — | 0.06 | — | 0.06 | — | — | — | — | 8.0 | — | 24.0 | — | — | — | 32.0 | — | — | — | 100.07 |
| *Composition of Fibers with $B_2O_3$ additions* | | | | | | | | | | | | | | | | | | | | | | | |
| 172 | 8.41 | 49.6 | — | 55.65 | 0.06 | 0.38 | 0.04 | 0.48 | 0.21 | 0.00 | — | 0.68 | 11.15 | 0.00 | 31.45 | 0.00 | 0.05 | 0.04 | 43.58 | — | 0.02 | 0.02 | 99.73 |
| *Composition of Fibers with $P_2O_5$ additions* | | | | | | | | | | | | | | | | | | | | | | | |
| 173 | — | 48.6 | 6.05 | 48.6 | 10.0 | 41.4 | — | 51.4 | — | — | — | .05 | — | — | — | — | — | — | — | — | — | — | 100.0 |
| *Composition of Fibers with $TiO_2$ additions* | | | | | | | | | | | | | | | | | | | | | | | |
| 174 | — | 63.5 | — | 63.5 | .01 | 0.08 | 0.21 | 1.10 | — | — | — | — | 0.33 | — | 35.55 | — | .03 | .01 | 35.92 | — | — | — | 100.52 |
| 175 | — | 59.2 | — | 59.2 | — | 0.33 | 0.40 | 0.73 | — | — | — | — | 0.41 | — | 39.1 | — | — | — | 39.51 | — | — | — | 99.44 |
| 176 | — | 59.5 | — | 59.5 | — | 0.31 | 0.42 | 0.73 | — | — | — | — | 0.42 | — | 39.1 | — | — | — | 39.52 | — | — | — | 99.75 |
| 177 | — | 59.7 | — | 59.7 | — | 0.34 | 0.50 | 0.84 | — | — | — | — | 0.46 | — | 38.7 | — | — | — | 39.16 | — | — | — | 99.70 |
| 178 | — | 60.0 | — | 60.0 | — | 0.36 | 0.54 | 0.90 | — | — | — | — | 0.48 | — | 38.3 | — | — | — | 38.78 | — | — | — | 99.68 |
| 179 | — | 59.2 | — | 59.2 | — | 0.35 | 0.58 | 0.93 | — | — | — | — | 0.98 | — | 37.0 | — | — | — | 37.98 | — | — | — | 98.11 |
| 180 | — | 54.3 | — | 54.3 | .01 | 1.29 | 0.58 | 1.88 | .09 | .01 | — | — | 10.20 | — | 32.75 | .01 | .04 | .02 | 43.12 | — | — | — | 99.31 |
| 181 | — | 59.2 | — | 59.2 | — | 0.32 | 0.83 | 1.15 | .08 | .01 | — | — | 1.13 | — | 36.6 | .03 | .05 | .01 | 37.73 | — | — | — | 98.08 |
| 182 | — | 46.85 | — | 46.85 | .02 | 2.03 | 0.84 | 2.89 | — | — | — | — | 20.6 | — | 29.2 | — | — | — | 49.98 | — | .02 | .02 | 99.74 |
| 182(a) | — | 59.4 | — | 59.4 | — | 0.38 | 2.31 | 2.69 | .06 | .00 | — | — | 2.06 | — | 34.9 | .00 | .03 | .01 | 36.96 | — | — | — | 99.05 |
| 183 | — | 59.05 | — | 59.05 | — | 0.30 | 2.65 | 2.95 | .06 | .00 | — | .05 | 3.08 | — | 34.84 | — | .03 | .01 | 38.07 | — | .02 | .02 | 100.09 |
| 184 | — | 57.96 | — | 57.96 | — | 0.42 | 3.11 | 3.53 | — | — | — | — | 3.55 | — | 35.17 | — | — | — | 38.72 | — | — | — | 100.21 |
| 185 | — | 57.8 | — | 57.80 | — | 0.56 | 3.12 | 3.68 | — | — | — | — | 3.74 | — | 34.4 | — | — | — | 38.14 | — | — | — | 99.62 |
| 186 | — | 59.05 | — | 59.05 | — | 0.38 | 3.27 | 3.65 | — | — | — | — | 2.57 | — | 36.94 | — | — | — | 39.51 | — | — | — | 102.21 |
| 187 | — | 56.88 | — | 56.88 | — | 0.32 | 3.30 | 3.62 | — | — | — | — | 4.00 | — | 36.45 | — | .04 | .01 | 40.45 | — | — | — | 100.95 |
| 188 | — | 57.7 | — | 57.7 | — | 0.20 | 3.30 | 3.50 | — | — | — | — | 3.00 | — | 36.0 | — | — | — | 39.0 | — | — | — | 100.20 |
| 189 | — | 58.19 | — | 58.19 | — | 0.39 | 3.36 | 3.75 | — | — | — | — | 3.26 | — | 35.39 | — | — | — | 38.65 | — | .01 | .01 | 100.59 |
| 190 | — | 57.86 | — | 57.86 | — | 0.36 | 3.37 | 3.73 | — | — | — | — | 3.22 | — | 35.66 | — | .02 | .02 | 38.88 | — | .02 | .02 | 100.47 |
| 191 | — | 58.6 | — | 58.6 | — | 0.58 | 3.67 | 4.25 | — | — | — | — | 2.72 | — | 33.5 | — | — | — | 36.22 | — | .02 | .02 | 99.07 |
| 192 | — | 58.4 | — | 58.4 | — | 0.65 | 3.69 | 4.34 | — | — | — | — | 2.59 | — | 35.2 | — | — | — | 35.79 | — | — | — | 98.53 |
| 193 | — | 56.65 | — | 56.65 | .02 | 3.35 | 4.50 | 7.87 | .05 | .00 | — | .00 | 3.35 | — | 31.9 | — | .05 | .01 | 35.36 | — | .01 | .01 | 99.89 |
| *Composition of Fibers with $ZrO_2$ additions* | | | | | | | | | | | | | | | | | | | | | | | |

TABLE 3-continued

COMPOSITION OF FIBERS

| US # NO. | ACIDIC OXIDES | | | | AMPHOTERIC OXIDES | | | | | BASIC OXIDES | | | | | | | | MISCELLANEOUS | | | TOTAL |
|---|---|---|---|---|---|---|---|---|---|---|---|---|---|---|---|---|---|---|---|---|---|
| | $B_2O_3$ | $SiO_2$ | $P_2O_5$ | SUB TOTAL | $TiO_2$ | $Al_2O_3$ | $ZrO_2$ | SUB TOTAL | $FeO_3$ | MnO | $La_2O_3$ | $Cr_2O_3$ | MgO | $Li_2O$ | CaO | BaO | $Na_2O$ | $K_2O$ | SUB TOTAL | $SO_3$ | Misc. | SUB TOTAL | |
| Composition of Fibers with $FeO_3$ and MnO additions | | | | | | | | | | | | | | | | | | | | | | | |
| 194 | — | 64.9 | — | 64.9 | — | 0.06 | — | 0.06 | 0.06 | — | — | — | 8.72 | — | 26.6 | — | — | — | 35.38 | — | — | — | 100.34 |
| 195 | — | 49.8 | — | 49.8 | .01 | 18.0 | .01 | 18.02 | .22 | — | — | — | 0.2 | — | 31.5 | — | — | — | 31.92 | .05 | .02 | .07 | 99.81 |
| 196 | — | 50.4 | — | 50.4 | .03 | 7.45 | .01 | 7.49 | .48 | .04 | — | — | 15.2 | — | 26.2 | — | .07 | .05 | 42.04 | .05 | .02 | .07 | 100.00 |
| 197 | — | 64.34 | — | 64.34 | — | 0.06 | — | 0.06 | .50 | — | — | — | 7.80 | — | 26.4 | — | — | — | 34.7 | — | — | — | 99.1 |
| 198 | — | 63.70 | — | 63.70 | — | 1.20 | — | 1.20 | .69 | — | — | — | 7.73 | — | 25.30 | — | — | — | 33.72 | — | — | — | 98.62 |
| 199 | — | 63.54 | — | 63.54 | — | 1.20 | — | 1.20 | .72 | — | — | — | 7.70 | — | 25.04 | — | — | — | 33.46 | — | — | — | 98.20 |
| 200 | — | 38.9 | — | 38.9 | .01 | 6.70 | .01 | 6.72 | .80 | — | — | — | 16.1 | — | 37.5 | — | — | — | 54.40 | .05 | .02 | .07 | 100.09 |
| 201 | — | 64.3 | — | 64.3 | — | 0.06 | — | 0.06 | .96 | — | — | — | 8.6 | — | 26.4 | — | — | — | 35.96 | — | — | — | 100.32 |
| 202 | — | 44.6 | — | 44.6 | .01 | 0.92 | .01 | 0.94 | 1.02 | — | — | — | 18.1 | — | 32.8 | — | — | — | 51.92 | — | — | — | 97.46 |
| 203 | — | 63.3 | — | 63.3 | — | 1.15 | — | 1.15 | 1.61 | — | — | — | 7.98 | — | 25.4 | — | — | — | 34.99 | — | — | — | 99.44 |
| 204 | — | 63.6 | — | 63.6 | — | 0.06 | — | 0.06 | 1.92 | — | — | — | 8.6 | — | 26.1 | — | — | — | 36.62 | — | — | — | 100.28 |
| 205 | — | 43.8 | — | 43.8 | .01 | 15.26 | .01 | 15.28 | 2.90 | .04 | — | .14 | 22.7 | — | 15.05 | — | .10 | .01 | 40.94 | .05 | .08 | .13 | 100.15 |
| 206 | — | 62.3 | — | 62.3 | — | 1.20 | — | 1.20 | 3.05 | — | — | — | 8.0 | — | 25.0 | — | — | — | 36.05 | — | — | — | 99.55 |
| 207 | — | 63.3 | — | 63.3 | — | 0.06 | — | 0.06 | 3.45 | — | — | — | 8.0 | — | 25.5 | — | — | — | 36.95 | — | — | — | 100.31 |
| 208 | — | 43.9 | — | 43.9 | .01 | 14.3 | .01 | 14.32 | 3.50 | — | — | — | 24.4 | — | 13.7 | — | — | — | 41.6 | — | — | — | 99.82 |
| 209 | — | 62.0 | — | 62.0 | — | 0.06 | — | 0.06 | 4.81 | — | — | — | 8.0 | — | 25.5 | — | — | — | 38.31 | — | — | — | 100.37 |
| 210 | — | 60.0 | — | 60.0 | — | 2.0 | — | 2.0 | — | 8.0 | — | — | 30.0 | — | — | — | — | — | 38.0 | — | — | — | 100.0 |
| 211 | — | 60.0 | — | 60.0 | — | — | — | — | — | 20.0 | — | — | 20.0 | — | — | — | — | — | 40.0 | — | — | — | 100.0 |
| Composition of Fibers with $La_2O_3$ additions | | | | | | | | | | | | | | | | | | | | | | | |
| 212 | — | 58.1 | — | 58.1 | — | 0.06 | — | 0.06 | 0.16 | — | 0.00 | — | 4.60 | — | 36.71 | — | — | — | 41.47 | — | — | — | 99.63 |
| 213 | — | 57.8 | — | 57.8 | — | 0.06 | — | 0.06 | 0.15 | — | 0.56 | — | 4.58 | — | 36.53 | — | — | — | 41.82 | — | — | — | 99.68 |
| 214 | — | 57.5 | — | 57.5 | — | 0.06 | — | 0.06 | 0.15 | — | 0.72 | — | 4.55 | — | 36.3 | — | — | — | 41.72 | — | — | — | 99.28 |
| 215 | — | 56.9 | — | 56.9 | — | 0.06 | — | 0.06 | 0.15 | — | 0.92 | — | 4.51 | — | 36.0 | — | — | — | 41.58 | — | — | — | 98.54 |
| Composition of Fibers with $Cr_2O_3$ additions | | | | | | | | | | | | | | | | | | | | | | | |
| 216 | — | 62.6 | — | 62.6 | 0.01 | 0.49 | 0.01 | 0.51 | 0.08 | .00 | — | 0.09 | 2.30 | — | 34.10 | 0.00 | 0.03 | 0.01 | 36.61 | — | — | — | 99.72 |
| Composition of Fibers with $Na_2O$ additions | | | | | | | | | | | | | | | | | | | | | | | |
| 217 | — | 64.7 | — | 64.7 | — | 0.06 | — | 0.06 | — | — | — | — | 8.7 | — | 26.6 | — | 0.28 | — | 35.58 | — | — | — | 100.34 |
| 218 | — | 64.5 | — | 64.5 | — | 0.06 | — | 0.06 | — | — | — | — | 8.7 | — | 26.5 | — | 0.45 | — | 35.65 | — | — | — | 100.21 |
| 219 | — | 64.4 | — | 64.4 | — | 1.20 | — | 1.20 | — | — | — | — | 8.6 | — | 26.5 | — | 0.71 | — | 35.80 | — | — | — | 100.26 |
| 220 | — | 63.5 | — | 63.5 | — | 0.06 | — | 0.06 | — | — | — | — | 8.5 | — | 26.1 | — | 0.87 | — | 35.70 | — | — | — | 100.40 |
| 221 | — | 64.3 | — | 64.3 | — | 0.06 | — | 0.06 | — | — | — | — | 8.5 | — | 26.2 | — | 0.93 | — | 35.63 | — | — | — | 99.99 |
| 222 | — | 64.2 | — | 64.2 | — | 0.06 | — | 0.06 | — | — | — | — | 8.6 | — | 26.4 | — | 1.11 | — | 36.11 | — | — | — | 100.37 |
| 223 | — | 64.0 | — | 64.0 | — | 0.06 | — | 0.06 | — | — | — | — | 8.6 | — | 26.3 | — | 1.40 | — | 36.3 | — | — | — | 100.36 |
| 224 | — | 63.0 | — | 63.0 | — | 0.06 | — | 0.06 | — | — | — | — | 8.5 | — | 25.9 | — | 2.60 | — | 37.0 | — | — | — | 100.06 |
| 225 | — | 60.3 | — | 60.3 | — | 0.06 | — | 0.06 | — | — | — | — | 8.1 | — | 24.8 | — | 6.84 | — | 39.74 | — | — | — | 100.1 |
| Composition of Conventional Mineral Wools | | | | | | | | | | | | | | | | | | | | | | | |
| 226 | — | 40.0 | — | 40.0 | 0.37 | 9.1 | 0.03 | 9.50 | 0.47 | 0.64 | — | 0.02 | 11.2 | 0.01 | 36.5 | 0.04 | 0.54 | 0.55 | 49.97 | 0.1 | 0.59 | 0.69 | 100.16 |
| 227 | — | 39.9 | 0.02 | 39.92 | 1.11 | 12.85 | 0.03 | 13.99 | 0.35 | 0.24 | — | 0.00 | 6.05 | 0.01 | 38.55 | 0.12 | 0.23 | 0.27 | 45.82 | 0.67 | 0.07 | 0.74 | 100.47 |
| 228 | — | 37.65 | 0.84 | 38.49 | 2.35 | 9.85 | 0.04 | 12.24 | 9.7 | 0.22 | — | 0.04 | 12.95 | 0.01 | 23.55 | 0.07 | 2.01 | 0.80 | 49.35 | 0.42 | 0.19 | 0.61 | 100.69 |

TABLE 3-continued

COMPOSITION OF FIBERS

| | ACIDIC OXIDES | | | AMPHOTERIC OXIDES | | | | BASIC OXIDES | | | | | | | | | MISCELLANEOUS | | | |
|---|---|---|---|---|---|---|---|---|---|---|---|---|---|---|---|---|---|---|---|---|
| US # NO. | $B_2O_3$ | $SiO_2$ | $P_2O_5$ | SUB TOTAL | $TiO_2$ | $Al_2O_3$ | $ZrO_2$ | SUB TOTAL | $FeO_3$ | $MnO$ | $La_2O_3$ | $Cr_2O_3$ | $MgO$ | $Li_2O$ | $CaO$ | $BaO$ | $Na_2O$ | $K_2O$ | SUB TOTAL | $SO_3$ | Misc. | SUB TOTAL | TOTAL |
| 229 | — | 41.75 | 0.12 | 41.87 | 1.07 | 16.0 | 0.03 | 17.10 | 3.75 | 0.23 | — | 0.02 | 6.45 | 0.63 | 27.75 | 0.03 | 2.04 | 0.63 | 41.53 | 0.56 | 0.08 | 0.64 | 101.14 |
| | | | | | | | | Composition of Refractory Fibers (Fibers with less than 25% Basic Oxides) | | | | | | | | | | | | | | | |
| 231 | — | 31.0 | — | 31.0 | — | 47.5 | 0.02 | 47.52 | — | — | — | — | — | — | 1.2 | — | 20.2 | — | 21.4 | — | — | — | 99.92 |
| 232 | — | 37.1 | — | 37.1 | — | 59.2 | — | 59.2 | — | — | — | — | — | — | 0.2 | — | 3.1 | — | 3.3 | — | — | — | 99.6 |
| 233 | — | 50.0 | — | 50.0 | — | 40.0 | — | 40.0 | — | — | — | — | — | — | 5.6 | — | 4.4 | — | 10.0 | — | — | — | 100 |
| 234 | — | 54.0 | — | 54.0 | 0.98 | 46.0 | — | 46.0 | — | — | — | — | — | — | — | — | — | — | — | — | — | — | 100 |
| 235 | — | 58.47 | 1.15 | 59.62 | 1.76 | 24.54 | 0.03 | 25.55 | 3.70 | 0.02 | — | 0.00 | 1.44 | 0.02 | 5.78 | 0.54 | 1.55 | 1.18 | 14.23 | 0.47 | 0.24 | 0.71 | 100.11 |
| 236 | — | 52.1 | — | 52.1 | 1.71 | 44.4 | .23 | 46.39 | .83 | — | — | — | 0.07 | — | 0.12 | — | .05 | .06 | 1.13 | — | — | — | 99.62 |
| 237 | — | 52.0 | — | 52.0 | 1.60 | 42.2 | 2.93 | 46.84 | .77 | — | — | — | 0.07 | — | 0.12 | — | .05 | .06 | 1.07 | — | — | — | 99.91 |
| 238 | — | 49.8 | — | 49.6 | 1.55 | 38.3 | 9.32 | 49.22 | .72 | — | — | — | 0.07 | — | 0.12 | — | .05 | .06 | 1.02 | — | — | — | 100.04 |
| 239 | — | 48.6 | — | 48.6 | 1.50 | 36.2 | 12.3 | 50.05 | .70 | — | — | — | 0.07 | — | 0.12 | — | .05 | .06 | 1.00 | — | — | — | 99.65 |
| 240 | — | 47.8 | — | 47.8 | 1.40 | 34.4 | 15.1 | 51.00 | .68 | — | — | — | 0.07 | — | 0.12 | — | .05 | .06 | .98 | — | — | — | 99.78 |
| 241 | — | 46.2 | — | 46.2 | — | 31.0 | 20.7 | 53.10 | .63 | — | — | — | — | — | — | — | .05 | — | 0.93 | — | — | — | 100.23 |
| 242 | — | 28 | — | 28 | 19 | 50 | 3 | 72 | — | — | — | — | — | 8.4 | — | — | — | — | 8.4 | — | — | — | 100 |
| 243 | — | 64.5 | — | 64.5 | — | 27.4 | — | 27.4 | — | — | — | — | — | — | — | — | — | — | — | — | — | — | 100.3 |

TABLE 4

TEST RESULTS ON FIBERS MADE WITH ALUMINA ADDITIONS

| | COMPOSITION, WT % | | | | | | | 5 Hour Saline | E-119 Fire Test | |
|---|---|---|---|---|---|---|---|---|---|---|
| | Acidic Oxides | Amphoteric Oxides | | Basic Oxides | | | Total | Extraction | Thickness | 2 Hour |
| NO. | SiO₂ | Al₂O₃ | Total | CaO | MgO | Total | Analytical | ppm, Si | Density | Test** |
| | | | | 0 to 1 ½% Amphoteric Oxides | | | | | | |
| 1 | 32 | 0.2 | 0.22 | 39 | 29 | 68.1 | 100.37 | * | * | * |
| 2 | 31.3 | 0.2 | 0.22 | 33.3 | 35.5 | 68.9 | 100.47 | * | * | * |
| 3 | 41.9 | 0.28 | 0.30 | 57.5 | 0.1 | 57.7 | 99.95 | 80 | — | — |
| 4 | 43.5 | 0.33 | 0.35 | 46.0 | 10.4 | 56.5 | 100.40 | 58 | — | — |
| 5 | 43.7 | 0.25 | 0.27 | 39.8 | 16.6 | 56.5 | 100.52 | 49 | 2.0/1.27 | F |
| 6 | 45.0 | 0.50 | 0.52 | 54.4 | 0.1 | 54.6 | 100.17 | 75 | — | — |
| 7 | 46.5 | 0.20 | 0.22 | 9.2 | 45.1 | 54.4 | 101.17 | * | * | * |
| 8 | 48.2 | 0.20 | 0.22 | 5.0 | 47.6 | 52.7 | 101.17 | * | * | * |
| 9 | 47.9 | 0.22 | 0.24 | 19.3 | 33.5 | 52.9 | 101.09 | 50 | — | — |
| 10 | 48.5 | 0.56 | 0.58 | 8.8 | 43.0 | 51.9 | 101.03 | 51 | — | — |
| 11 | 48.6 | 0.56 | 0.58 | 13.3 | 38.3 | 51.7 | 100.93 | 46 | — | — |
| 12 | 49.2 | 0.42 | 0.44 | 28.0 | 22.9 | 51.0 | 100.69 | 67 | — | — |
| 13 | 49.2 | 0.17 | 0.19 | 3.4 | 48.3 | 51.8 | 101.24 | * | * | * |
| 14 | 50.0 | 0.10 | 0.12 | 7.0 | 43.0 | 50.1 | 100.27 | 56 | — | — |
| 15 | 50.7 | 0.10 | 0.12 | 15.7 | 33.7 | 49.5 | 100.37 | 60 | — | — |
| 16 | 51.1 | 0.45 | 0.47 | 29.8 | 19.0 | 48.9 | 100.52 | 65 | — | — |
| 17 | 51.2 | 0.33 | 0.35 | 39.7 | 9.0 | 48.8 | 100.40 | 51 | 2.0/2.59 | F |
| 18 | 53.2 | 0.64 | 0.66 | 2.8 | 44.3 | 47.2 | 101.11 | 56 | — | F |
| 19 | 53.4 | 0.28 | 0.30 | 45.6 | 0.1 | 45.8 | 99.55 | 77 | 2.0/1.97 | F |

EXPERIMENTAL DATA

| | COMPOSITION, WT % | | | | | | | 5 Hour Saline | E-119 Fire Test | |
|---|---|---|---|---|---|---|---|---|---|---|
| | Acidic Oxides | Amphoteric Oxides | | Basic Oxides | | | Total | Extraction | Thickness | 2 Hour |
| NO. | SiO₂ | Al₂O₃ | Total | CaO | MgO | Total | Analytical | ppm, Si | Density | Test** |
| | | | | 0 to 1 ½% Amphoteric Oxides | | | | | | |
| 20 | 53.8 | 0.33 | 0.35 | 35.1 | 10.8 | 46.0 | 100.20 | 83 | 2.0/1/97 | F |
| 21 | 53.9 | 0.40 | 0.42 | 25.5 | 20.5 | 46.1 | 100.47 | 68 | — | — |
| 22 | 54.5 | 1.00 | 1.02 | 7.5 | 36.5 | 44.1 | 99.67 | 30 | — | — |
| 23 | 55.9 | 0.08 | 0.10 | 43.0 | 0.45 | 43.55 | 99.60 | 51 | 2.0/1.94 | F |
| 24 | 56.0 | 0.40 | 0.42 | 27.0 | 17.0 | 44.1 | 100.57 | 69 | 2.0/2.12 | F |
| 25 | 56.35 | 0.20 | 0.24 | 34.4 | 8.25 | 42.75 | 99.39 | 70 | 2.0/1.87 | F |
| 26 | 56.4 | 0.91 | 0.93 | 35.1 | 7.39 | 42.59 | 99.97 | 47 | — | — |
| 27 | 57.0 | 1.03 | 1.05 | 24.5 | 17.6 | 42.2 | 100.30 | 46 | — | — |
| 28 | 57.0 | •1.09 | 1.11 | 35.0 | 6.84 | 41.94 | 100.10 | 40 | — | — |
| 29 | 57.25 | 0.92 | 0.94 | 36.95 | 3.95 | 41.1 | 99.56 | 56 | 1.88/2.20 | F |
| 30 | 57.8 | 0.75 | 0.78 | 34.75 | 6.2 | 41.05 | 99.85 | — | 2.0/1.97 | F |
| 31 | 58.1 | 0.03 | 0.05 | 36.7 | 4.53 | 41.33 | 99.53 | 59 | 2.0/1.91 | F |
| 32 | 58.2 | 1.08 | 1.10 | 35.7 | 4.79 | 40.59 | 99.94 | 80 | 2.0/1.91 | F |
| 33 | 58.3 | 0.03 | 0.05 | 40.8 | 0.31 | 41.21 | 99.61 | 49 | 2.0/1.91 | F |
| 34 | 58.4 | 0.37 | 0.39 | 15.3 | 26.3 | 41.7 | 100.54 | 61 | 2.0/1.91 | F |
| 35 | 58.6 | 0.09 | 0.11 | 35.0 | 5.36 | 40.46 | 99.22 | 74 | 2.0/1.94 | P |
| 36 | 58.7 | 0.05 | 0.07 | 40.2 | 0.27 | 40.57 | 99.39 | 58 | 2.0/1.91 | F |
| 37 | 58.5 | 0.49 | 0.53 | 34.4 | 5.6 | 40.1 | 99.32 | 59 | 2.0/2.01 | P |
| 38 | 58.8 | 0.41 | 0.43 | 35.4 | 6.2 | 41.7 | 100.98 | 56 | — | — |
| 39 | 58.9 | 0.08 | 0.10 | 34.2 | 6.10 | 40.4 | 99.45 | 67 | 2.0/1.86 | P |
| 40 | 59.0 | 0.24 | 0.26 | 35.9 | 3.8 | 39.9 | 99.21 | 49 | 2.0/1.97 | P |
| 41 | 59.1 | 0.09 | 0.11 | 40.3 | 0.43 | 40.83 | 100.09 | 68 | 2.0/1.90 | P |
| 42 | 59.2 | 0.24 | 0.26 | 4.7 | 36.8 | 41.60 | 101.11 | 47 | 2.5/1.4 | F |
| 43 | 59.15 | 0.32 | 0.34 | 35.55 | 4.75 | 40.40 | 99.94 | 60 | 2.0/1.95 | P |
| 44 | 59.4 | 0.04 | 0.06 | 29.8 | 10.7 | 40.60 | 100.11 | 61 | 2.0/1.92 | P |
| 45 | 59.5 | 0.02 | 0.04 | 34.2 | 5.98 | 40.28 | 99.87 | 77 | 2.0/1.90 | P |
| 46 | 59.5 | 0.02 | 0.04 | 32.1 | 8.16 | 40.36 | 99.95 | 73 | 2.0/1.89 | F |
| 47 | 59.6 | 1.43 | 1.45 | 22.5 | 16.8 | 39.6 | 100.8 | 51 | 2.0/1.88 | F |
| 48 | 59.6 | 0.03 | 0.05 | 28.7 | 11.4 | 40.2 | 99.9 | 70 | 2.0/1.91 | P |
| 50 | 59.8 | 0.28 | 0.30 | 40.5 | 0.11 | 40.71 | 100.86 | 30 | 2.0/2.01 | P |
| 51 | 59.9 | 1.48 | 1.50 | 25.8 | 12.9 | 39.0 | 100.55 | 47 | 2.0/1.98 | P |
| 52 | 59.9 | 1.31 | 1.33 | 28.1 | 11.0 | 39.4 | 100.78 | 45 | 2.0/1.95 | P |
| 53 | 60.0 | 1.41 | 1.43 | 22.3 | 16.4 | 39.0 | 100.58 | 41 | 2.0/1.91 | P |
| 54 | 60.3 | 0.17 | 0.19 | 32.3 | 6.36 | 38.76 | 99.30 | 59 | 2.0/1.89 | P |
| 55 | 60.4 | 1.05 | 1.07 | 28.5 | 9.85 | 38.45 | 99.97 | 45 | 2.0/1.95 | P |

TABLE 4-continued

| # | C1 | C2 | C3 | C4 | C5 | C6 | Total | C8 | Ratio | Res |
|---|---|---|---|---|---|---|---|---|---|---|
| 56 | 60.5 | 1.11 | 1.13 | 27.9 | 10.7 | 38.9 | 100.68 | 36 | 2.0/1.94 | F |
| 57 | 60.7 | 0.93 | 0.95 | 28.7 | 9.47 | 38.27 | 99.97 | 51 | 2.0/1.93 | P |
| 58 | 60.8 | 0.2 | 0.22 | 36. | 3. | 39.10 | 100.17 | 56 | — | — |
| 59 | 61.7 | 0.02 | 0.04 | 32.6 | 5.19 | 37.89 | 99.68 | 65 | 2.0/1.97 | P |
| 60 | 62.4 | 0.04 | 0.06 | 21.7 | 15.5 | 37.3 | 99.81 | 76 | 2.0/1.88 | P |
| 61 | 62.5 | 0.02 | 0.04 | 30.3 | 6.64 | 37.04 | 99.63 | 66 | 2.0/1.92 | P |
| 62 | 62.5 | 0.03 | 0.05 | 29.5 | 7.70 | 37.30 | 99.90 | 64 | 2.0/1.82 | P |
| 63 | 63.1 | 0.02 | 0.04 | 31.1 | 5.28 | 36.48 | 99.67 | 46 | 2.0/1.95 | P |
| 64 | 63.1 | 1.25 | 1.27 | 25.2 | 10.2 | 35.5 | 99.92 | 19 | 2.0/1.96 | P |
| 65 | 63.5 | 1.49 | 1.51 | 24.0 | 10.9 | 35.0 | 100.06 | 12 | 2.0/1.91 | P |
| 66 | 63.8 | 1.13 | 1.15 | 28.4 | 5.79 | 34.29 | 99.29 | 52 | 2.0/2.01 | P |
| 67 | 63.8 | 1.41 | 1.43 | 22.8 | 11.8 | 34.7 | 99.98 | 17 | 2.0/1.88 | P |
| 68 | 64.1 | 1.23 | 1.25 | 30.97 | 2.60 | 33.67 | 99.07 | 7 | 2.0/1.88 | P |
| 69 | 64.1 | 1.47 | 1.49 | 28.6 | 4.83 | 33.53 | 99.17 | 49 | 2.0/1.99 | P |
| 70 | 65.3 | 0.03 | 0.05 | 27.4 | 6.68 | 34.18 | 99.58 | 37 | 2.0/1.91 | P |
| 71 | 65.4 | 1.15 | 1.17 | 3.12 | 30.1 | 33.32 | 99.94 | 46 | 2.0/1.88 | F |
| 72 | 65.6 | 0.01 | 0.03 | 27.4 | 6.50 | 34.0 | 99.68 | 35 | 2.0/2.00 | P |
| 73 | 65.8 | 0.02 | 0.04 | 28.6 | 5.21 | 33.91 | 99.80 | 44 | — | — |
| 74 | 65.9 | 0.03 | 0.05 | 21.9 | 11.8 | 33.8 | 99.80 | 30 | 2.0/1.87 | P |
| 75 | 65.9 | 0.03 | 0.05 | 25.8 | 7.88 | 33.78 | 99.78 | 25 | 2.0/1.91 | P |
| 76 | 65.4 | 1.15 | 1.17 | 3.12 | 30.1 | 33.23 | 99.84 | 46 | 2.0/1.88 | F |
| 77 | 66.1 | 0.59 | 0.61 | 4.02 | 28.7 | 33.02 | 99.88 | 50 | — | F |
| 78 | 67.1 | — | — | 6.43 | 26.5 | 33.03 | 100.18 | 78 | 2.0/1.89 | F |
| 79 | 67.2 | 0.02 | 0.04 | 8.67 | 24.0 | 32.77 | 100.06 | 84 | 2.0/2.03 | F |
| 80 | 68.4 | — | — | 1.6 | 30.1 | 31.8 | 100.25 | * | * | * |
| 81 | 68.6 | 0.25 | 0.27 | 29.0 | 1.09 | 30.19 | 99.11 | 18 | 2.0/2.00 | P |
| 82 | 68.8 | — | — | 10.2 | 21.3 | 31.6 | 10.45 | 31 | — | — |
| 83 | 68.9 | 0.03 | 0.05 | 18.1 | 12.7 | 30.9 | 99.9 | 30 | 2.0/2.00 | P |
| 84 | 69.0 | | | 7.2 | 23.8 | 31.0 | 100.05 | 18 | — | — |
| | | | | 1 ½% to 3% Amphoteric Oxides | | | | | | |
| 85 | 50.0 | 2.00 | 2.02 | 5.0 | 43.0 | 48.1 | 100.17 | — | * | * |
| 86 | 52.6 | 2.00 | 2.02 | 3.8 | 41.7 | 45.6 | 100.27 | 51 | 2.0/1.88 | F |
| 87 | 56.1 | 2.41 | 2.43 | 30.3 | 10.6 | 41.0 | 99.58 | 39 | 2.0/1.89 | F |
| 88 | 56.2 | 1.82 | 1.84 | 24.4 | 17.3 | 41.8 | 99.89 | 65 | — | — |
| 89 | 58.1 | 2.01 | 2.03 | 3.83 | 36.3 | 40.43 | 100.71 | 44 | 2.0/1.99 | P |
| 90 | 58.9 | 2.26 | 2.28 | 36.6 | 1.4 | 38.1 | 99.33 | 18 | 2.0/1.82 | P |
| 91 | 59.0 | 2.93 | 2.95 | 36.3 | 1.0 | 37.4 | 99.40 | 9 | 2.0/1.87 | P |
| 92 | 59.4 | 0.38 | 2.69 | 34.9 | 2.1 | 37.1 | 99.24 | 25 | 2.0/2.06 | P |
| 93 | 59.8 | 2.54 | 2.56 | 27.4 | 10.0 | 37.5 | 99.91 | 11 | — | — |
| 94 | 60.1 | 1.68 | 1.70 | 28.0 | 9.9 | 38.0 | 99.85 | 29 | 2.0/1.98 | P |
| 95 | 60.2 | 2.21 | 2.23 | 32.7 | 4.9 | 37.7 | 100.18 | 50 | 2.0/2.04 | P |
| 96 | 61.4 | 2.17 | 2.19 | 26.2 | 10.1 | 36.4 | 100.04 | 18 | 2.0/1.87 | P |
| 97 | 61.4 | 1.66 | 1.68 | 29.9 | 6.9 | 36.9 | 100.03 | 61 | 2.0/1.91 | P |
| 98 | 61.8 | 2.84 | 2.86 | 34.0 | 0.2 | 34.3 | 99.01 | 51 | 2.0/1.93 | P |
| 99 | 62.0 | 2.81 | 2.83 | 34.1 | 0.2 | 34.4 | 99.28 | 55 | 2.0/1.90 | P |
| 100 | 62.1 | 2.75 | 2.77 | 33.8 | 0.2 | 34.1 | 99.02 | 13 | 2.0/1.91 | P |
| 101 | 62.7 | 1.79 | 1.81 | 25.6 | 9.4 | 35.1 | 99.66 | 18 | 2.0/1.96 | P |
| 102 | 63.0 | 2.54 | 2.56 | 33.1 | 0.2 | 33.4 | 99.05 | 37 | 2.0/1.87 | P |
| 103 | 63.9 | 1.84 | 1.86 | 30.7 | 2.5 | 33.3 | 99.11 | 38 | 2.0/1.94 | P |
| 104 | 64.1 | 1.83 | 1.85 | 17.7 | 16.3 | 34.3 | 100.4 | 12 | 2.0/1.95 | P |
| 105 | 65.1 | 2.15 | 2.17 | 9.74 | 23.1 | 33.15 | 100.57 | 17 | — | P |
| 106 | 65.6 | 1.56 | 1.58 | 2.7 | 29.7 | 32.5 | 99.73 | 33 | 2.0/1.91 | P |
| 107 | 66.7 | 1.80 | 1.82 | 30.7 | 0.1 | 30.9 | 99.47 | 2 | 2.0/1.90 | P |
| | | | | 3 to 4% Amphoteric Oxides | | | | | | |
| 108 | 49.8 | 3.5 | 3.52 | 4.98 | 40.9 | 46.18 | 99.65 | 33 | — | — |
| 109 | 50.3 | 3.58 | 3.60 | 45.0 | 0.64 | 45.74 | 99.69 | 19 | 2.0/1.96 | F |
| 110 | 55.1 | 3.77 | 3.79 | 7.89 | 33.7 | 41.89 | 100.93 | 33 | 2.0/2.06 | P |
| 111 | 55.6 | 6.24 | 3.66 | 37.1 | 4.65 | 41.85 | 101.16 | — | 2.0/2.12 | F |
| 112 | 56.5 | 0.35 | 3.65 | 36.51 | 4.17 | 40.78 | 100.98 | — | 2.0/1.99 | F |
| 113 | 56.7 | 3.52 | 3.54 | 23.5 | 16.2 | 39.8 | 100.09 | 19 | 2.0/1.89 | F |
| 114 | 56.7 | 3.06 | 3.08 | 23.4 | 16.6 | 40.28 | 100.11 | 40 | 2.0/4.02 | F |
| 115 | 56.88 | 0.32 | 3.64 | 36.45 | 4.00 | 40.45 | 101.02 | 51 | — | — |
| 115a | 57.5 | 3.29 | 3.31 | 37.7 | 0.75 | 38.55 | 99.41 | 6 | 2.0/1.93 | F |
| 116 | 58.1 | 3.05 | 3.07 | 25.6 | 12.8 | 38.5 | 99.72 | 20 | 2.0/1.9 | F |
| 117 | 58.2 | 3.75 | 3.77 | 36.4 | 0.67 | 37.17 | 99.19 | 38 | 2.0/2.0 | F |
| 119 | 58.80 | 3.76 | 3.78 | 36.7 | 0.24 | 37.04 | 99.67 | 28 | 2.0/1.97 | F |
| 120 | 61.2 | 3.77 | 3.79 | 34.0 | 0.24 | 34.34 | 99.38 | 18 | 2.0/1.94 | P |
| | | | | 4 to 6% Amphoteric Oxides | | | | | | |
| 121 | 49.7 | 4.04 | 4.06 | 26.4 | 19.6 | 46.1 | 99.91 | 37 | — | — |
| 122 | 55.8 | 5.20 | 5.22 | 30.1 | 9.2 | 39.4 | 100.47 | 7 | 2.0/1.88 | F |
| 123 | 56.85 | 5.40 | 5.41 | 31.8 | 5.65 | 37.55 | 99.91 | 4 | 2.0/1.99 | F |
| 124 | 57.0 | 4.68 | 4.70 | 22.0 | 15.6 | 37.7 | 99.45 | 32 | 2.0/2.00 | F |
| | | | | 6 to 8% Amphoteric Oxides | | | | | | |
| 125 | 39.2 | 6.90 | 6.92 | 38.5 | 14.0 | 52.6 | 98.72 | 37 | — | — |
| 126 | 46.9 | 7.66 | 7.68 | 44.8 | 0.3 | 45.2 | 99.83 | 6 | 2.0/1.97 | F |

TABLE 4-continued

| | | | | | | | | | | |
|---|---|---|---|---|---|---|---|---|---|---|
| 127 | 49.3 | 6.40 | 6.42 | 25.3 | 18.4 | 43.8 | 99.57 | 19 | 2.0/2.0 | F |
| 128 | 50.4 | 7.45 | 7.48 | 26.2 | 15.2 | 41.5 | 99.43 | 18 | 2.0/3.17 | F |
| 129 | 54.7 | 7.60 | 7.62 | 30.7 | 6.5 | 37.3 | 99.67 | 7 | 2.0/1.98 | F |
| 130 | 56.1 | 6.34 | 6.36 | 30.6 | 6.9 | 37.6 | 100.11 | 4 | 2.0/2.04 | F |
| 131 | 57.9 | 6.7 | 6.72 | 5.9 | 29.7 | 35.6 | 100.27 | 2 | — | — |
| 132 | 58.5 | 6.16 | 6.18 | 31.2 | 4.0 | 35.2 | 99.93 | 2 | 2.0/2.01 | F |
| 133 | 59.7 | 7.08 | 7.10 | 27.9 | 5.1 | 33.1 | 99.9 | 2 | 2.0/2.04 | F |
| | | | | 8 to 10% Amphoteric Oxides | | | | | | |
| 134 | 38.6 | 9.3 | 9.32 | 38.4 | 13.7 | 52.2 | 100.17 | 12 | — | — |
| 135 | 42.8 | 8.8 | 9.13 | 36.7 | 9.6 | 46.76 | 98.69 | 13 | — | — |
| 136 | 44.5 | 8.76 | 8.78 | 45.5 | 0.52 | 46.12 | 99.45 | 3 | — | — |
| 137 | 52.1 | 8.9 | 8.92 | 23.7 | 16.2 | 40.0 | 101.02 | 1.2 | — | — |
| 138 | 52.5 | 9.67 | 9.69 | 33.5 | 4.21 | 37.81 | 100.05 | 1.0 | 2.0/1.99 | F |
| 139 | 53.7 | 8.7 | 8.72 | 22.5 | 16.3 | 38.9 | 101.37 | 1.7 | — | — |
| 140 | 56.6 | 9.2 | 9.22 | 23.5 | 10.9 | 34.5 | 100.37 | 1.2 | 2.0/2.05 | F |
| | | | | 10 to 12% Amphoteric Oxides | | | | | | |
| 141 | 41.0 | 10.05 | 10.07 | 48.25 | 0.3 | 48.70 | 99.87 | 6 | 2.0/2.00 | F |
| 142 | 51.3 | 10.9 | 10.92 | 37.2 | 0.2 | 37.5 | 99.77 | 0.8 | 2.0/2.04 | F |
| 143 | 52.4 | 10.7 | 10.72 | 23.1 | 16.1 | 39.3 | 102.42 | 0.7 | 2.0/2.00 | F |
| 144 | 52.7 | 10.2 | 10.22 | 22.1 | 16.0 | 38.2 | 101.12 | 0.5 | — | — |
| | | | | 12 to 20% Amphoteric Oxides | | | | | | |
| 145 | 41.5 | 13.0 | 13.02 | 44.2 | 0.5 | 44.8 | 99.37 | 1.2 | — | — |
| 146 | 49.8 | 18.0 | 18.02 | 31.5 | 0.2 | 32.02 | 99.89 | 0.5 | — | — |
| 147 | 55.6 | 12.9 | 12.92 | 13.2 | 18.4 | 31.7 | 100.27 | 1.8 | 2.0/2.54 | F |
| | | | | 20 to 30% Amphoteric Oxides | | | | | | |
| 148 | 36.5 | 28.4 | 28.42 | 34.4 | 0.3 | 34.8 | 99.77 | 0.6 | — | — |
| 149 | 40.3 | 21.5 | 21.52 | 37.5 | 0.3 | 37.9 | 99.77 | 0.8 | — | — |
| 150 | 42.6 | 25.7 | 25.72 | 31.2 | 0.3 | 31.6 | 99.97 | 0.6 | — | — |
| 151 | 48.4 | 22.4 | 22.42 | 16.5 | 12.6 | 29.2 | 100.07 | 0.5 | 2.0/2.01 | F |
| 152 | 59.9 | 22.8 | 22.82 | 3.1 | 14.0 | 17.2 | 99.97 | 0.7 | 2.0/2.01 | F |
| | | | | 30 to 40% Amphoteric Oxides | | | | | | |
| 153 | 45.9 | 31.3 | 31.32 | 5.9 | 16.7 | 22.7 | 99.97 | 2.3 | — | — |

\* = Not Fiberizable
\*\* P = Pass, F = Failed

TABLE 5

FIBERS MADE WITH VARIOUS ADDITIVE CONSTITUENTS

| | ANALYSES | | | | | % Additive | | 5 Hour Saline Extraction | E-119 Fire Test | |
|---|---|---|---|---|---|---|---|---|---|---|
| Test No. | Acidic Oxides | Amphoteric Oxides | Basic Oxides | Misc. | Total | (Incl. in Total) | | ppm. Si | Thickness Density | 2 hour Test |
| Fibers with $B_2O_3$ Additions | | | | | | | | | | |
| 164 | 65.12 | 0.06 | 35.3 | — | 100.48 | 0.32% | $B_2O_3$ | 53 | 2.0/1.94 | P |
| 165 | 64.42 | 1.20 | 34.8 | — | 100.42 | 0.52% | " | 20 | 2.0/1.88 | p |
| 166 | 65.24 | 0.06 | 35.2 | — | 100.5 | 0.64% | " | 43 | 2.0/1.89 | p |
| 167 | 65.32 | 0.06 | 35.2 | — | 100.58 | 0.82% | " | 45 | 2.0/2.00 | P |
| 168 | 65.43 | 0.06 | 34.9 | — | 100.39 | 1.33% | " | 47 | 2.0/1.95 | P |
| 169 | 65.47 | 0.06 | 34.9 | — | 100.43 | 1.37% | " | 45 | 2.0/— | P |
| 170 | 65.82 | 0.06 | 34.6 | — | 100.48 | 2.22% | " | 46 | 2.0/2.02 | P |
| 171 | 68.01 | 0.06 | 32.0 | — | 100.07 | 8.41% | " | 52 | 2.0/6.45 | P |
| Fibers with $P_2O_5$ addition | | | | | | | | | | |
| 172 | 55.65 | 0.48 | 43.58 | 0.02 | 99.7 | 6.06% | $P_2O_5$ | 71 | 2.0/1.94 | F |
| Fibers with $TiO_2$ addition | | | | | | | | | | |
| 173 | 48.6 | 51.4 | — | — | 100. | 10% | $TiO_2$ | 0.4 | 2.01/1.94 | P |
| Fibers with $ZrO_2$ additions | | | | | | | | | | |
| 174 | 63.5 | 1.10 | 35.92 | — | 100.52 | 0.21% | $ZrO_2$ | 25 | 2.0/2.01 | P |
| 175 | 59.2 | 0.73 | 39.51 | — | 99.44 | 0.40% | " | 48 | 2.0/2.00 | P |
| 176 | 59.5 | 0.73 | 39.52 | — | 99.75 | 0.42% | " | 55 | — | — |
| 177 | 59.7 | 0.84 | 39.16 | — | 99.70 | 0.50% | " | 32 | — | — |

TABLE 5-continued

FIBERS MADE WITH VARIOUS ADDITIVE CONSTITUENTS

| Test No. | ANALYSES | | | | | % Additive (Incl. in Total) | | 5 Hour Saline Extraction ppm. Si | E-119 Fire Test | |
|---|---|---|---|---|---|---|---|---|---|---|
| | Acidic Oxides | Amphoteric Oxides | Basic Oxides | Misc. | Total | | | | Thickness Density | 2 hour Test |
| 178 | 60.0 | 0.90 | 38.78 | — | 99.68 | 0.54% | " | 40 | — | — |
| 179 | 59.2 | 0.93 | 37.98 | — | 98.11 | 0.58% | " | 46 | 2.0/2.02 | P |
| 180 | 54.3 | 1.88 | 43.12 | .01 | 99.31 | 0.58% | " | 67 | 2.0/2.00 | F |
| 181 | 59.2 | 1.15 | 37.73 | — | 98.08 | 0.83% | " | 57 | 2.0/2.03 | P |
| 182 | 46.85 | 2.89 | 49.98 | .02 | 99.74 | 0.84% | " | 44 | 2.0/2.17 | F |
| 182a | 59.4 | 2.69 | 36.96 | .02 | 99.05 | 2.31% | " | 25 | 2.0/2.00 | P |
| 183 | 59.05 | 2.95 | 38.07 | — | 100.09 | 2.65% | " | 38 | 2.0/2.20 | P |
| 184 | 57.96 | 3.53 | 38.72 | — | 100.21 | 3.11% | " | 25 | 2.0/2.37 | F |
| 185 | 57.80 | 3.68 | 38.14 | — | 99.62 | 3.12% | " | 10 | 2.0/2.03 | F |
| 186 | 59.05 | 3.65 | 39.51 | — | 102.21 | 3.27% | " | 15 | 2.1/2.11 | P |
| 187 | 56.88 | 3.62 | 40.45 | — | 100.95 | 3.30% | " | 51 | — | — |
| 188 | 57.7 | 3.50 | 39.0 | — | 100.20 | 3.30% | " | 13 | 2.0/2.06 | P |
| 189 | 58.19 | 3.75 | 38.65 | — | 100.59 | 3.36% | " | 12 | — | — |
| 190 | 57.86 | 3.73 | 38.88 | — | 100.47 | 3.37% | " | — | 2.0/2.00 | F |
| 191 | 58.6 | 4.25 | 36.22 | — | 99.07 | 3.67% | " | 7 | 2.0/2.00 | P |
| 192 | 58.4 | 4.34 | 35.79 | — | 98.53 | 3.69% | " | 3 | 2.0/2.00 | P |
| 193 | 58.65 | 7.87 | 35.36 | .01 | 99.89 | 4.50% | " | 1.3 | 2.0/2.07 | F |
| Fibers with $FeO_3$ additions | | | | | | | | | | |
| 194 | 64.9 | 0.06 | 35.38 | — | 100.34 | 0.06% | $FeO_3$ & MnO | 56 | 2.0/1.88 | P |
| 195 | 49.8 | 18.02 | 31.92 | 0.07 | 99.81 | 0.22% | " " | 0.5 | — | — |
| 196 | 50.4 | 7.49 | 42.04 | 0.07 | 100.00 | 0.52% | " " | 18 | — | — |
| 197 | 64.34 | 0.06 | 34.7 | — | 99.1 | 0.50% | " " | 51 | 2.0/1.91 | P |
| 198 | 63.70 | 1.20 | 33.02 | — | 98.62 | 0.69% | " " | 24 | 2.0/1.88 | F |
| 199 | 63.54 | 1.20 | 33.46 | — | 98.20 | 0.72% | " " | 35 | 2.0/2.00 | P |
| 200 | 38.9 | 6.72 | 54.40 | 0.07 | 100.09 | 0.80% | " " | 17 | — | — |
| 201 | 64.3 | 0.06 | 35.96 | — | 100.32 | 0.96% | " " | 45 | 2.0/1.88 | P |
| 202 | 44.6 | 0.94 | 51.92 | — | 97.46 | 1.02% | " " | 49 | — | — |
| 203 | 63.3 | 1.15 | 34.99 | — | 99.44 | 1.61% | " " | 12 | 2.0/1.95 | F |
| 204 | 63.6 | 0.06 | 36.62 | — | 100.15 | 1.92% | " " | 31 | 2.0/1.91 | P |
| 205 | 43.8 | 15.28 | 40.94 | 0.13 | 100.02 | 2.94% | " " | 1.3 | — | — |
| 206 | 62.3 | 1.20 | 36.05 | — | 99.55 | 3.05% | " " | 7 | 2.0/1.98 | F |
| 207 | 63.3 | 0.06 | 36.95 | — | 100.31 | 3.45% | " " | 18 | 2.0/1.88 | F |
| 208 | 43.9 | 14.32 | 41.6 | — | 99.82 | 3.56% | " " | 2 | — | — |
| 209 | 62.0 | 0.06 | 38.31 | — | 100.37 | 4.81% | " " | 13 | 2.0/1.98 | F |
| 210 | 60.0 | 2.0 | 38.0 | — | 100.0 | 8.0% | " " | 0.9 | 2.0/2.00 | F |
| 211 | 60.0 | — | 40.0 | — | 100.0 | 20.0% | " " | 0.7 | 2.0/2.00 | F |
| Fibers with $La_2O_3$ additions | | | | | | | | | | |
| 212 | 58.1 | 0.06 | 41.47 | — | 99.63 | 0.00% | $La_2O_3$ | 76 | 2.0/1.97 | F |
| 213 | 57.8 | 0.06 | 41.82 | — | 99.68 | 0.56% | " | 69 | 2.0/1.97 | F |
| 214 | 57.5 | 0.06 | 41.72 | — | 99.28 | 0.72% | " | 78 | 2.0/1.98 | F |
| 215 | 56.9 | 0.06 | 41.58 | — | 99.54 | 0.92% | " | 70 | 2.0/1.98 | F |
| Fibers with $Cr_2O_3$ additions | | | | | | | | | | |
| 216 | 62.6 | 0.51 | 36.61 | — | 99.72 | 0.09% | $Cr_2O_3$ | 28 | 2.0/2.16 | P |
| Fibers with $Na_2O$ additions | | | | | | | | | | |
| 217 | 64.7 | 0.06 | 35.58 | — | 100.34 | 0.28% | $Na_2O$ | 45 | 2.0/1.91 | P |
| 218 | 64.5 | 0.06 | 35.68 | — | 100.21 | 0.45% | " | 57 | 2.0/1.97 | P |
| 219 | 64.4 | 0.06 | 35.80 | — | 100.26 | 0.71% | " | 54 | 2.0/1.97 | P |
| 220 | 63.5 | 1.20 | 35.70 | — | 100.40 | 0.87% | " | 30 | 2.0/1.90 | P |
| 221 | 64.3 | 0.06 | 35.63 | — | 99.99 | 0.93% | " | 51 | 2.0/1.90 | P |
| 222 | 64.2 | 0.06 | 36.11 | — | 100.37 | 1.11% | " | 57 | 2.0/1.99 | P |
| 223 | 64.0 | 0.06 | 36.3 | — | 100.36 | 1.40% | " | 43 | 2.0/1.99 | P |
| 224 | 63.0 | 0.06 | 37.0 | — | 100.06 | 2.60% | " | 50 | 2.0/2.16 | F |
| 225 | 60.3 | 0.06 | 39.74 | — | 100.1 | 6.84% | " | 70 | 2.0/1.87 | F |
| Conventional Mineral Wool Fibers | | | | | | | | | | |
| 226 | 40.0 | 9.50 | 49.97 | 0.69 | 100.16 | | — | 7 | 2.0/3.50 | F |
| 227 | 39.92 | 13.99 | 45.82 | 0.74 | 100.47 | | — | 1.2 | 2.0/5.23 | F |
| 228 | 38.49 | 12.24 | 49.35 | 0.61 | 100.69 | | — | 0.6 | 2.0/3.42 | F |
| 229 | 41.87 | 17.10 | 41.53 | 0.64 | 101.14 | | — | 1.0 | 2.0/3.86 | F |
| Refractory Fibers (Fibers with less than 25% Basic Oxides) | | | | | | | | | | |
| 231 | 31.0 | 47.52 | 21.4 | — | 99.92 | | — | 2 | 2.0/2.10 | F |
| 232 | 37.1 | 59.2 | 3.3 | — | 99.6 | | — | 0.6 | 2.0/5.38 | F |

TABLE 5-continued

FIBERS MADE WITH VARIOUS ADDITIVE CONSTITUENTS

| Test No. | Acidic Oxides | Amphoteric Oxides | Basic Oxides | Misc. | Total | % Additive (Incl. in Total) | 5 Hour Saline Extraction ppm. Si | E-119 Fire Test Thickness Density | 2 hour Test |
|---|---|---|---|---|---|---|---|---|---|
| 233 | 50.0 | 40.0 | 10.0 | — | 100 | — | 0.8 | 2.0/2.00 | P |
| 234 | 54.0 | 46.0 | — | — | 100 | — | 0.3 | 2.0/2.00 | P |
| 235 | 59.62 | 25.55 | 14.23 | 0.7 | 100.11 | — | 0.3 | 2.0/2.00 | P |
| 236 | 52.1 | 46.39 | 1.13 | — | 99.62 | — | 1.0 | — | — |
| 237 | 52.0 | 46.84 | 1.07 | — | 99.91 | — | 0.4 | — | — |
| 238 | 49.8 | 49.22 | 1.02 | — | 100.04 | — | 0.3 | — | — |
| 239 | 48.6 | 50.05 | 1.00 | — | 99.65 | — | 0.4 | — | — |
| 240 | 47.8 | 51.00 | 0.98 | — | 99.78 | — | 0.3 | — | — |
| 241 | 46.2 | 53.10 | 0.93 | — | 100.23 | — | 0.4 | — | — |
| 242 | 28 | 72 | — | — | 100 | — | 0.5 | — | — |
| 243 | 64.5 | 27.4 | 8.4 | — | 100.3 | — | 0.8 | 2.0/1.85 | F |

TABLE 6

CONTINUOUS SERVICE TEMPERATURE FOR CONSTANT $SiO_2/CaO/MgO$ RATIOS

| $SiO_2$/CaO/ MgO Ratio | 0 | 5 | 10 | 20 | 30 |
|---|---|---|---|---|---|
| | Continuous Service Temperature for max 5% shrinkage °F. | | | | |
| 50/50/0 | 1480 | 1480 | 1470 | 1420 | 1550 |
| 50/40/10 | 1440 | 1430 | 1420 | 1400 | 1520 |
| 50/30/10 | 1400 | 1380 | 1370 | 1350 | 1480 |
| 60/40/0 | 1500 | 1460 | 1460 | 1460 | 1600 |
| 60/30/10 | 1430 | 1420 | 1400 | 1410 | 1520 |
| 60/20/20 | 1380 | 1370 | 1360 | 1350 | 1500 |

Reasonable modifications and variations are possible from the foregoing disclosure without departing from either the spirit or scope of the invention as defined in the claims.

We claim:

1. A refractory inorganic fiber composition consisting essentially of, based upon the total fiber composition:
   (a) 58.5–approximately 68.9 wt % $SiO_2$;
   (b) approximately 18.1–approximately 40.5 wt % CaO;
   (c) approximately 0.11–approximately 16.4 wt % MgO;
   (d) 0–approximately 1.5 wt % $Al_2O_3$;
   (e) 0–approximately 4.5 wt % $ZrO_2$;
   (f) 0–approximately 8.41 wt % $B_2O_3$;
   (g) 0–approximately 2.9 wt % $Fe_2O_3$;
   (h) 0–approximately 2.6 wt % $Na_2O$; and
   (i) 0–approximately 10 wt % $TiO_2$;
   wherein the total quantity of $Al_2O_3$, $ZrO_2$, $TiO_2$, $B_2O_3$, and iron oxides does not exceed 10 wt % based upon the total fiber composition; and wherein the inorganic fiber composition withstands the rising temperatures of a simulated fire reaching 1,010° C. in two hours and is soluble in physiological saline solution.

2. A refractory inorganic fiber composition according to claim 1, wherein components (a) through (c) are present in the amounts of:
   (a) about 64.1 wt % $SiO_2$;
   (b) about 30.97 wt % CaO; and
   (c) about 2.6 wt % MgO.

3. A refractory inorganic fiber composition consisting essentially of, based on the total fiber composition, approximately:
   (a) 58.1–66.7 wt % $SiO_2$;
   (b) 2.7–36.6 wt % CaO;
   (c) 0.1–36.3 wt % MgO
   (d) 1.5–3 wt % $Al_2O_3$;
   (e) 0–4.5 wt % $ZrO_2$;
   (f) 0–8.41 wt % $B_2O_3$;
   (g) 0–2.9 wt % $Fe_2O_3$;
   (h) 0–2.6 wt % $Na_2O$; and
   (i) 0–10 wt % $TiO_2$;
   wherein the total quantity of $Al_2O_3$, $ZrO_2$, $TiO_2$, $B_2O_3$, and iron oxides does not exceed 10 wt % based on the total fiber composition; and wherein the inorganic fiber composition withstands the rising temperatures of a simulated fire reaching 1,010° C. in two hours and is soluble in physiological saline solution.

4. A refractory inorganic fiber composition consisting essentially of, based on the total fiber composition, approximately:
   (a) 55.1–61.2 wt % $SiO_2$;
   (b) 7.89–34.0 wt % CaO;
   (c) 0.24–33.7 wt % MgO;
   (d) 3–4 wt % $Al_2O_3$;
   (e) 0–4.5 wt % $ZrO_2$;
   (f) 0–8.41 wt % $B_2O_3$;
   (g) 0–2.9 wt % $Fe_2O_3$;
   (h) 0–2.6 wt % $Na_2O$; and
   (i) 0–10 wt % $TiO_2$;
   wherein the total quantity of $Al_2O_3$, $ZrO_2$, $TiO_2$, $B_2O_3$, and iron oxides does not exceed 10 wt % based on the total fiber composition; and wherein the inorganic fiber composition withstands the rising temperatures of a simulated fire reaching 1,010° C. in two hours and is soluble in physiological saline solution.

5. A refractory inorganic fiber composition according to claim 1, wherein the quantity of $B_2O_3$ is between 0.32 wt % and 8.41 wt %.

6. A refractory inorganic fiber composition according to claim 5, wherein the amount of $SiO_2$, CaO, and MgO is about 64.1 wt %, 30.97 wt %, and 2.6 wt %, respectively.

7. A refractory inorganic fiber composition according to claim 3, wherein the quantity of $B_2O_3$ is between 0.32 wt % and 8.41wt %.

8. A refractory inorganic fiber composition according to claim 4, wherein the quantity of $B_2O_3$ is between 0.32 wt % and 8.41 wt %.

9. A refractory inorganic fiber composition according to claim 1, wherein the quantity of $ZrO_2$ is between 0.21 wt % and 4.5 wt %.

10. A refractory inorganic fiber composition according to claim 9, wherein the amount of $SiO_2$, CaO, and MgO is about 64.1 wt %, 30.97 wt %, and 2.6 wt %, respectively.

11. A refractory inorganic composition according to claim 3, wherein the quantity of $ZrO_2$ is between 0.21 wt % and 4.5 wt %.

12. A refractory inorganic composition according to claim 4, wherein the quantity of $ZrO_2$ is between 0.21 wt % and 4.5 wt %.

* * * * *